(12) United States Patent
Lejri et al.

(10) Patent No.: US 10,921,470 B2
(45) Date of Patent: Feb. 16, 2021

(54) INVERSION FOR TECTONIC STRESS

(71) Applicant: Schlumberger Technology Corporation, Sugar Land, TX (US)

(72) Inventors: Mustapha Lejri, Montpellier (FR); Frantz Maerten, Montpellier (FR); Laurent Maerten, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 235 days.

(21) Appl. No.: 15/572,472

(22) PCT Filed: May 18, 2016

(86) PCT No.: PCT/US2016/032939
§ 371 (c)(1),
(2) Date: Nov. 7, 2017

(87) PCT Pub. No.: WO2016/187237
PCT Pub. Date: Nov. 24, 2016

(65) Prior Publication Data
US 2018/0172857 A1 Jun. 21, 2018

(30) Foreign Application Priority Data

May 20, 2015 (FR) .................................. 15 54515

(51) Int. Cl.
*G01V 1/28* (2006.01)
*G01V 99/00* (2009.01)

(52) U.S. Cl.
CPC ............. *G01V 1/282* (2013.01); *G01V 99/00* (2013.01); *G01V 2210/646* (2013.01)

(58) Field of Classification Search
CPC ... G01V 1/282; G01V 2210/646; G01V 99/00
See application file for complete search history.

(56) References Cited

U.S. PATENT DOCUMENTS

| 9,164,192 B2 | 10/2015 | Maerten et al. |
| 2003/0158669 A1 | 8/2003 | Davidson |
| 2008/0071505 A1* | 3/2008 | Huang ................ G01V 11/00 703/2 |
| 2010/0149913 A1* | 6/2010 | Savary-Sismondini .................... G01V 1/30 367/25 |
| 2011/0022322 A1 | 1/2011 | Davidson |

(Continued)

FOREIGN PATENT DOCUMENTS

| WO | 2012/003027 A1 | 1/2012 |
| WO | 2014/036045 A1 | 3/2014 |

OTHER PUBLICATIONS

Delvaux et al., "New aspects of tectonic stress inversion with reference to the TENSOR program", 2003, pp. 75-99.*

(Continued)

*Primary Examiner* — John E Breene
*Assistant Examiner* — Eyob Hagos

(57) ABSTRACT

A method (710) can include receiving data for fractures associated with a geologic environment (712); performing stress inversion, based at least in part on a portion of the data and assignment of different mechanical fracture types to different populations of the fractures, to recover tectonic stress (716); and outputting the tectonic stress (720).

27 Claims, 16 Drawing Sheets

(56) References Cited

U.S. PATENT DOCUMENTS

| | | | | |
|---|---|---|---|---|
| 2011/0077918 | A1* | 3/2011 | Mutlu | G06F 30/23 |
| | | | | 703/2 |
| 2012/0072188 | A1* | 3/2012 | Maerten | G01V 99/005 |
| | | | | 703/2 |
| 2012/0239298 | A1 | 9/2012 | Morris et al. | |
| 2013/0191044 | A1* | 7/2013 | Maerten | G06F 17/00 |
| | | | | 702/42 |
| 2013/0333879 | A1 | 12/2013 | Rasheed | |
| 2014/0067269 | A1* | 3/2014 | Maerten | G01V 99/005 |
| | | | | 702/2 |

OTHER PUBLICATIONS

Lefranc, et al., "3D structural restoration and geomechanical forward modeling in a visco-plastic medium to natural fracture prediction in a Malay producing field, offshore Malaysia," Offshore Technology Conference, Mar. 25, 2014, Mar. 28, 2014, pp. 1-7.

Search Report for the equivalent European patent application 16797174.6 dated Mar. 4, 2019.

Communication pursuant to Art 94(3) for the equivalent European patent application 16797174.6 dated Mar. 25, 2019.

Angelier, "Fault slip analysis and palaeostress reconstruction," In: Hancock, P.L. (Ed.), Continental Deformation. Pergamon Press, Oxford, 1994b, pp. 53-100.

Angelier, et al., "Classification automatique et distinction des phases superposées en tectonique de failles," C. R. Acad. Sci. Série D 290, 1980, pp. 651-654.

Armijo, et al., "The inverse problem in microtectonics and the separation of tectonic phases," Tectonophysics 82, 1982, pp. 145-160.

Bourne, et al., "Predictive modeling of naturally fractured reservoirs using geomechanics and flow simulation," GeoArabia, 2000, v. 6, pp. 27-42.

Etchecopar, "An inverse problem in microtectonics for the determination of stress tensors from fault striation analysis," Journal of Structural Geology, vol. 3, No. 1, 1981, pp. 51-65.

Fry, "Striated faults: visual appreciation of their constraint on possible paleostress tensors," Journal of Structural Geology 1999, vol. 21, pp. 7-21.

Galindo-Zaldivar, et al., "Faulting phase differentiation by means of computer search on a grid pattern," Annales Tectonicae II 2, 1988, pp. 90-97.

Hardcastle, et al., "BRUTE3 and SELECT: QUICKBASIC 4 programs for determination of stress tensor configurations and separation of heterogeneous populations of fault-slip data," Computers & Geosciences 17 (1), 1991, pp. 23-43.

Huang, et al., "A FORTRAN-77 program to separate a heterogeneous set of orientations into subsets," Computers & Geosciences 15 (1), 1989, pp. 1-7.

Madden, et al., "Mechanics of nonplanar faults at extensional steps with application to the 1992 M 7.3 Landers, California, earthquake," Journal of Geophysical Research: Solid Earth, vol. 118, pp. 3249-3263.

Maerten, "Mechanical interaction of intersecting normal faults: theory, field examples and applications," Ph.D. thesis, 1999, Stanford University, Stanford, California, U.S.A.

Nemcok, et al., "A stress inversion procedure for polyphase fault/slip data sets," Journal of Structural Geology 17 (10), 1995, pp. 1445-1453.

Nemcok, et al., "A stress inversion procedure for polyphase calcite twin and fault/slip data sets," Journal of Structural Geology 21 (6), 1999, pp. 597-611.

Yamaji, "The multiple inverse method: a new technique to separate stresses from heterogeneous fault-slip data," Journal of Structural Geology 22 (4), 2000, pp. 441-452.

International Search Report and Written Opinion for the equivalent International patent application PCT/US2016/032939 dated Aug. 24, 2016.

International Preliminary Report on Patentability for the equivalent International patent application PCT/US2016/032939 dated Nov. 30, 2017.

* cited by examiner

Plot 810

| Tectonic phase | R | θ |
|---|---|---|
| 1 | 0.5 | 90 |
| 2 | 1.5 | 145 |
| 3 | 2.5 | 0 |

Table 905

Plot 1110

Plot 1105 (synthetic)

Plot 1210

Plot 1205
(synthetic)

Plot 1310

Plot 1330

Plot 1410

- [ ] Shear
- [▨] Joints
- [▦] Stylolites

Plot 1430

- [▦] Type/Phase OK
- [▨] Type/Phase NOK
- [ ] Type/Phase Not Defined Not Associated

INVERSION FOR TECTONIC STRESS

CROSS-REFERENCE TO RELATED APPLICATION

The present document is based on and claims priority to FR Application Serial No.: 1554515, filed May 20, 2015, which is incorporated herein by reference in its entirety.

BACKGROUND

Paleostress pertains to stresses that acted in the geological past (e.g., thousands to millions of years ago). Paleostress analysis can include deriving directions along which stress acted and gave rise to structural feature in a geologic environment. Variations in stress fields within the Earth's crust can result in a variety of mechanical responses, which may be classified according to scale. For example, consider microscopic (e.g., crystal deformation, including twinning, pressure solution, microfractures, aligned fluid inclusions, etc.) and macroscopic (e.g., folding, fracturing, faulting, etc. As an example, deformation (e.g., folding or fracturing) without dissolution may be referred to as mechanical strain. Both macroscopic and microscopic strain may be elastic, and exist as long as differential stress exists, or it may be inelastic in that the deformation due to a particular stress event remains even after the stress is removed. In the latter case, inelastic deformation, the stress field responsible for the deformation if it can be inferred, is, then, the paleostress. As an example, Anderson or Andersonian analysis can estimate the state of stress from faults (e.g., according to Anderson's theory of faulting). However, evidence from geologic environments demonstrates that features (e.g., oblique slip faults, etc.) may be incompatible with Anderson's theory. To handle such environments, a technique such as an inversion technique may be employed where, for example, paleostresses are inferred from information about geological faults.

SUMMARY

A method can include receiving data for fractures associated with a geologic environment; performing stress inversion, based at least in part on a portion of the data and assignment of different mechanical fracture types to different populations of the fractures, to recover tectonic stress; and outputting the tectonic stress. A system can include a processor; memory; and one or more modules stored in the memory where the one or more modules can include processor-executable instructions to instruct the system where instructions include instructions to receive data for fractures associated with a geologic environment; perform stress inversion, based at least in part on a portion of the data and assignment of different mechanical fracture types to different populations of the fractures, to recover tectonic stress; and output the tectonic stress. One or more computer-readable storage media can include processor-executable instructions to instruct a computing system where instructions can include instructions to receive data for fractures associated with a geologic environment; perform stress inversion, based at least in part on a portion of the data and assignment of different mechanical fracture types to different populations of the fractures, to recover tectonic stress; and output the tectonic stress. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
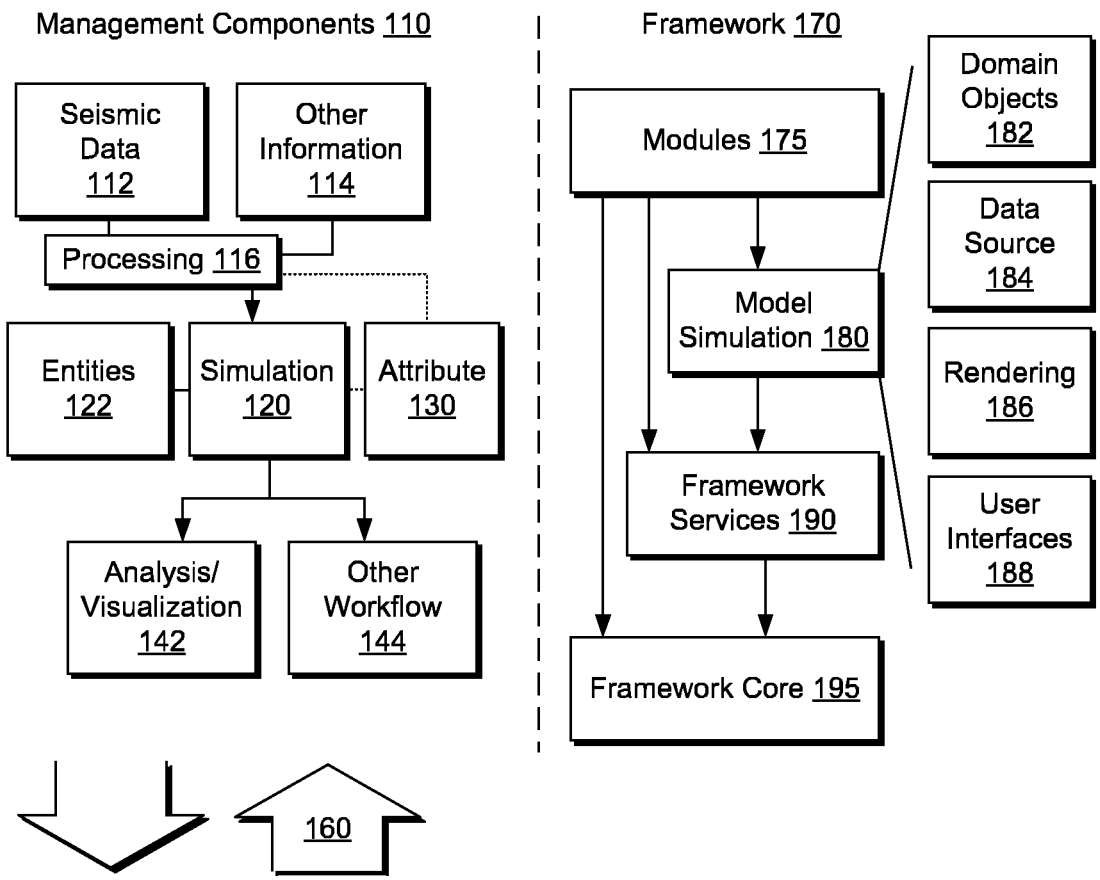
FIG. 1 illustrates an example system that includes various components for simulating a geologic environment.
Figure 1:
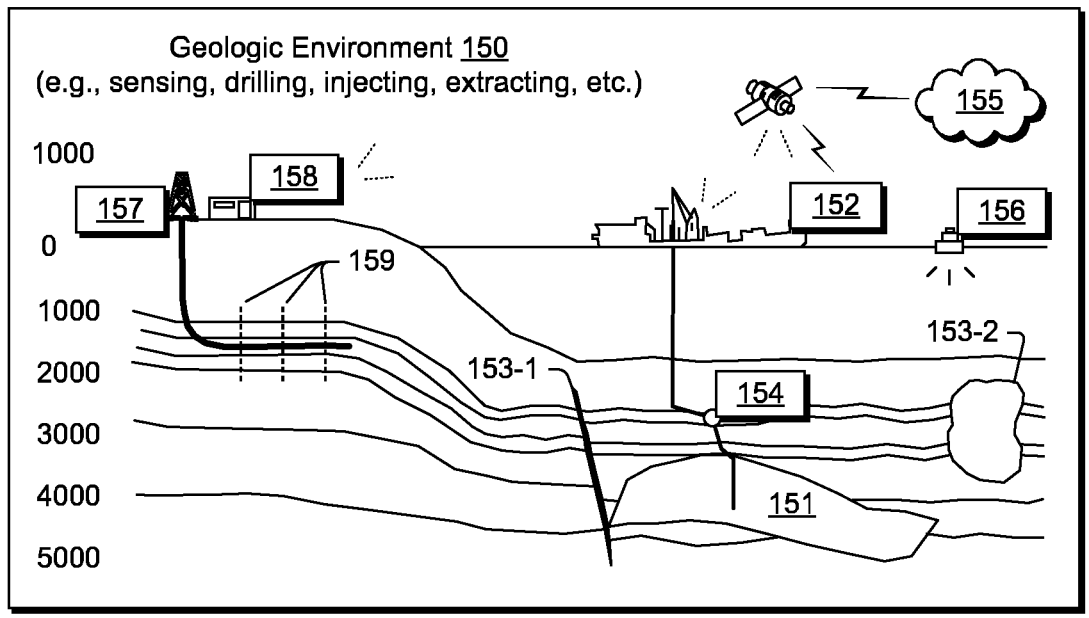

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Subterranean formations, and related physical phenomena, may be modeled using various techniques. Such techniques can involve gridding, or other discretization, of one or more subterranean volumes that make up a formation. As an example, a process may include performing stress inversion via a geomechanical model. Where a formation includes one or more fluids (e.g., gas, liquid, or both), a modeling technique may include formulating equations that account for physical phenomena such as pressure, saturation and composition.

As an example, a geomechanical framework can include one or more modules that include processor-executable instructions. As an example, such a framework can include instructions to implement the boundary element method (BEM) where surfaces in space are described at least in part via boundary elements. As an example, such a framework may include equations that can describe angular dislocations, for example, for modeling three-dimensional stress fields. As an example, a model may provide for modeling of discontinuities in an elastic, heterogeneous, isotropic whole- or half-space.

As an example, a method may include modeling an oil and gas field that spans a volume measured in, for example, kilometers. A model of such a field may include thousands of grid cells or grid points where each cell or point can include associated values, which may be equation unknowns, for example, optionally with respect to time. Given initial values (e.g., initial conditions) and boundary values (e.g., boundary conditions), an iterative solution technique may be applied to the model equations to determine the equation unknowns at one or more points in time (e.g., steady-state or transient).

As mentioned, a method may be applied as part of a framework. For example, a framework may include features for modeling a geologic environment. As an example, seismic interpretation may be performed using seismic to simulation software such as the PETREL® seismic to simulation software framework (Schlumberger Limited, Houston, Tex.), for example, as part of a workflow for building a model. While the PETREL® seismic to simulation software framework is mentioned, other types of software, frameworks, etc., may be employed for purposes building a model. As an example, a framework such as the iBem3D™ framework iBem3D, formally Poly3D™ (Schlumberger Limited, Houston, Tex.) may be implemented for building a model, solving equations, etc.

As an example, the iBem3D™ framework may be implemented for stress modeling, for example, using one or more modules. As an example, such a package may implement a boundary element method (BEM). Such a framework may provide for characterization and modeling of subseismic fractures, which may facilitate better drilling decisions (e.g., using fundamental principles of physics that govern rock deformation). For example, output may include modeled density and orientation of subseismic faults in a region (e.g., which may include a reservoir or reservoirs). As an example, a framework may provide for characterization and modeling of fractures where at least a portion of the fractures may be associated with an operation such as a hydraulic fracturing operation.

As an example, a framework may provide for 3D fault modeling. In such an example, a workflow may aim to identify regions of hydrocarbons for possible recovery. Multi-dimensional fault modeling may facilitate building and/or supplementing a geologic model of reservoir structure. Forward capabilities in a framework may help to reduce uncertainty in seismic interpretation of complex fault networks and allow more accurate under-constrained complex geological models to be built, analyzed, etc.

As to well design, drilling in structurally complex reservoirs may present challenges, particularly where an area may be tectonically active. A framework may provide for creation of multi-dimensional models, for example, of present-day heterogeneous stress fields that may be caused by active faulting, salt diapirs, etc.

As an example, a tectonic stress can be a paleostress or, for example, associated with activity such as artificial fracturing (e.g., hydraulic fracturing, etc.).

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive (e.g., a formation present as a substantially horizontal layer or layers). In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
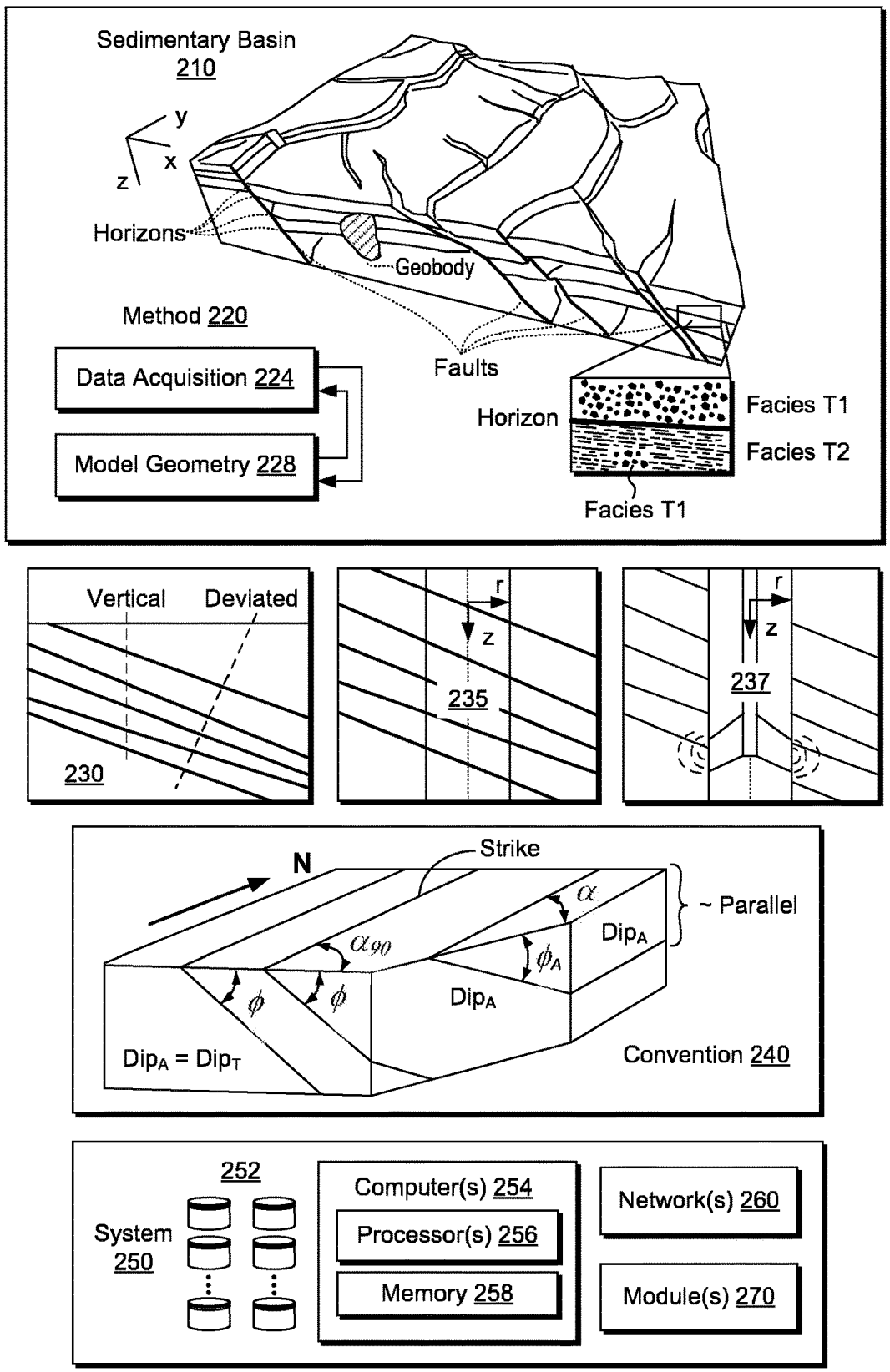
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a substantially horizontal surface and various subsurface layers. As an example, a borehole may be substantially vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle α); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

Figure 3:
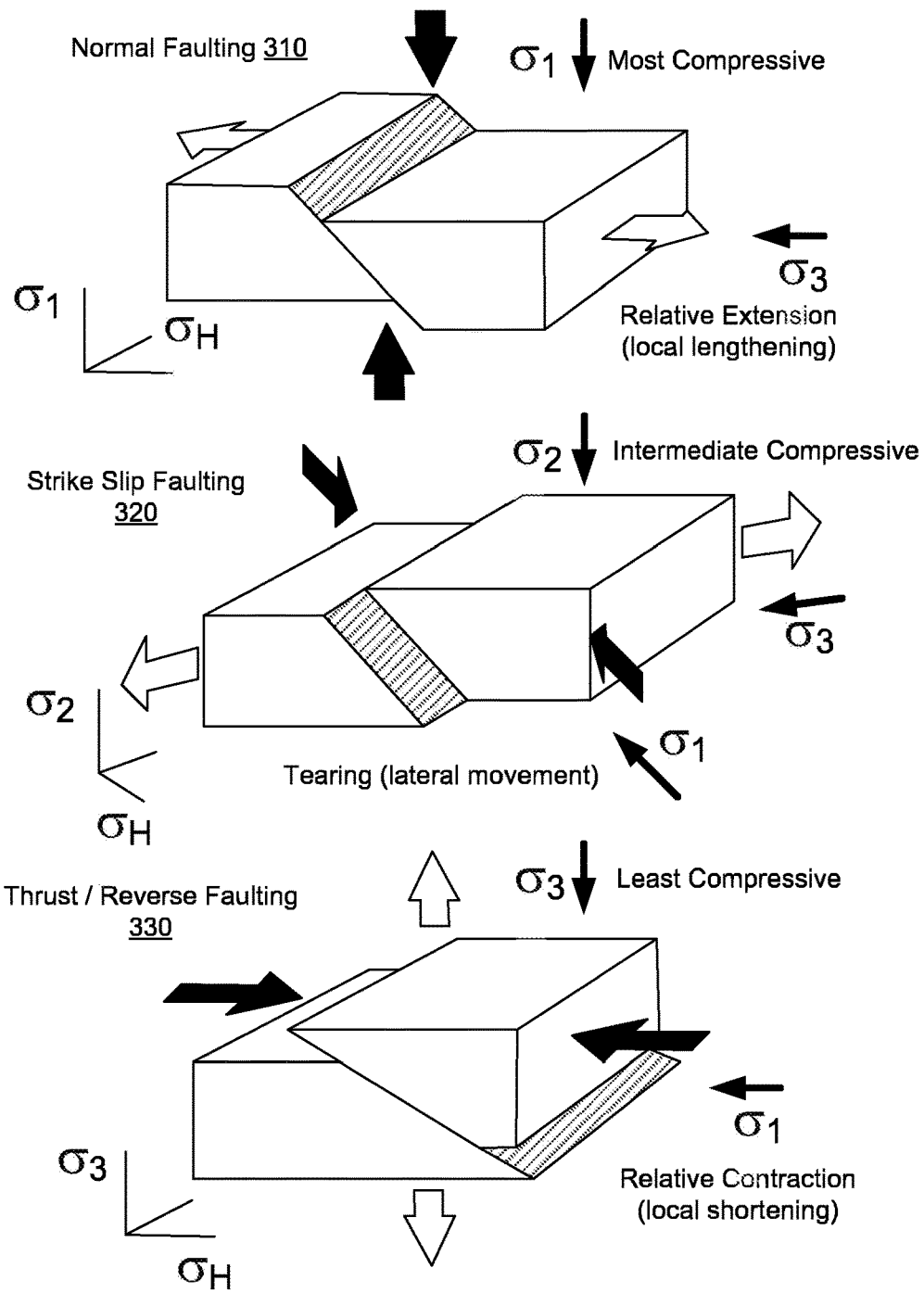
FIG. 3 illustrates examples of tectonic regimes.

FIG. 3 shows an example of a tectonic regime 300 and examples of normal faulting 310, strike slip faulting 320 and thrust or reverse faulting 330. Stress may be defined, for example, as force per unit area acting on a plane. In a solid body, for example, a stress state at a point in the solid body may be described by orientations and magnitudes of three stresses called principal stresses, which are oriented perpendicular to each other (e.g., orthogonal to each other).

As shown in FIG. 3, $\sigma_1$, $\sigma_2$ and $\sigma_3$ are compressive or tensile principal stresses where, in magnitude, 1>2>3. As an example, about a point, the three principal stresses may be shown, or represented, as an ellipsoid where the magnitude of each component defines a maximum (e.g., and a "minimum") along a respective one of the three orthogonal axes. The "minimum" is actually another maximum as compressive stress and shortening strain are considered positive in rock mechanics and structural geology because in the Earth the three principal stresses tend to be compressive (e.g., except around underground voids such as caves, very near to the Earth's surface, etc.).

The tectonic regime 300 may be defined by considering one axis being vertical. For example, a normal fault regime corresponds to $\sigma_1$ being vertical, a strike slip fault regime corresponds to $\sigma_2$ being vertical and a thrust or reverse fault regime corresponds to $\sigma_3$ being vertical. The tectonic regime 300 may also define stresses $\sigma_H$, $\sigma_h$ and $\sigma_v$ to be the maximum horizontal stress ($\sigma_H$), a minimum horizontal stress ($\sigma_h$) that may be orthogonal to the maximum horizontal stress, and a vertical stress ($\sigma_v$). The orientation of the maximum horizontal stress $\sigma_H$ may be defined by an angle $\theta_H$, which may be local (e.g., for a point or a feature), far field, etc.

Figure 4:
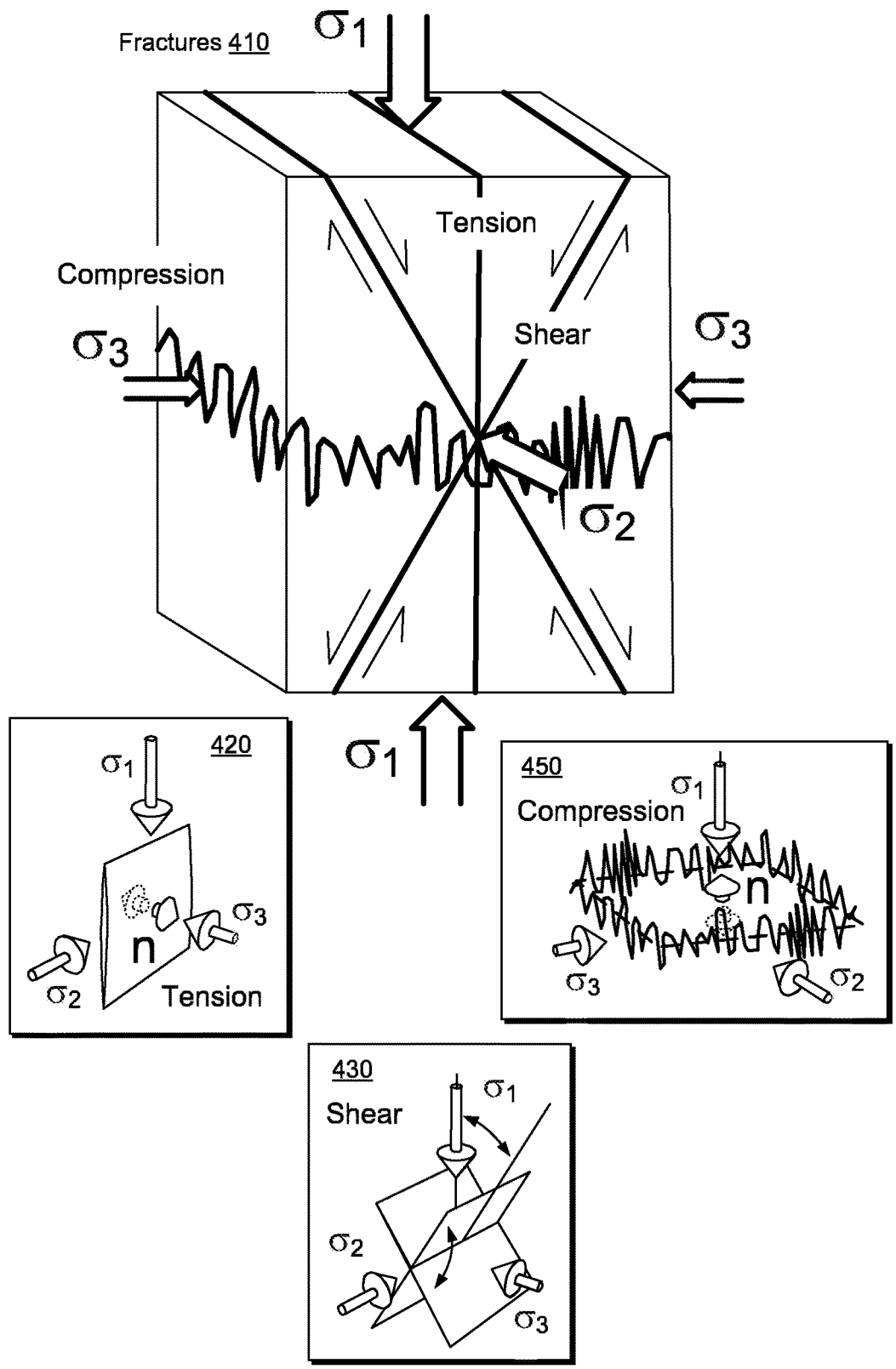
FIG. 4 illustrates examples of features and associated stresses.

FIG. 4 shows some examples of orientation information with respect to fractures 410, which may include a tension fracture 420 (e.g., a joint), a shear fracture 430 and a compression fracture 450 (e.g., a stylolite). As an example, the fractures 420, 430 and 450 may be referred to as mechanical fractures (e.g., mechanical fracture types); noting that chemical, thermal, etc. phenomena may be involved.

A tension fracture may form where tensile stress in a direction perpendicular to a potential fracture plane reaches a tensile strength of rock. A tension fracture may exhibit an extension perpendicular to fracture walls. Types of tension fractures (e.g., or tensile fractures) include, for example, joints and veins.

A shear fracture may be generated by shear stress. A shear fracture may be a fracture along which the relative movement is parallel to fracture walls. Types of shear fractures include, for example, faults and deformation bands.

A compression fracture (or an anticrack or closing fracture) may form with a compressive stress in a direction perpendicular to a potential fracture plane. A compression fracture may show a contraction perpendicular to fracture walls. Types of compression fractures include, for example, stylolites and compaction bands.

As an example, a natural fracture orientation may be unrelated to orientations of present-day stresses in a rock mass because, for example, fracture orientation reflects orientations of stresses in the fractured rock at the time of fracture formation (e.g., consider an event in geologic time), regional stress regimes change through time, natural fractures were formed in geological past under influence of paleostresses (e.g., ancient stresses) that no longer prevail, etc.

As an example, orientation and density of fracture sets may vary with position in a region of interest because stress regimes vary in space as well as in time even if the regional stress maintains a relatively constant orientation (e.g., far field stress).

As an example, local stresses may differ in orientation and/or magnitude from regional stresses due to folding, faulting, lithological differences, diagenesis, pore-pressure variations and other influences.

Referring to FIG. 4, a joint may be a natural rock fracture formed predominantly by mode I movement. As an example, plumose surface morphology may be diagnostic of jointing. Unmineralized joints may be quite permeable and contained joints may be joints that are contained within individual beds of a brittle lithology. Two particular types of joints may be useful because they may provide slip-sense, and sometimes slip-direction, criteria for fault movement: Pinnate joints, which are a type of joint that forms adjacent to faults during fault movement and/or propagation; and tail joints or wing cracks form at the tip of a fault.

FIG. 4 also shows two faults that intersect, for example, to form an acute angle and an obtuse angle (see, e.g., double headed arrows in the diagram of for shear fracture 430). As an example, a fault may be a type of natural rock fracture formed predominantly by mode II and/or mode III movements. It is possible, for example, that a natural rock fracture that initially formed as a joint may be reactivated as a sliding-mode fracture and be deemed a "faulted" joint.

Faults may have a wide range of morphologies and fill types. Faults may range from highly permeable to highly impermeable depending on the manner of formation and type of fill. Fault slip-sense and slip-direction may, at times, be determined from surface features such as slickenlines for instance.

As to a stylolite (e.g., a pressure solution seam), it may be defined as a zone of insoluble residue produced by stress-enhanced dissolution. Stylolites may have a cone-in-cone structure that produces a characteristic zig-zag appearance in cross section (see, e.g., the stylolite represented in FIG. 4). A stylolite is a type fracture, for example, a stress-corrosion anticrack.

Stylolites may serve as flow barriers because they may include insoluble residue that may be very fine-grained and, for example, clay-rich. Stylolites may be weak and, for example, readily reactivated as joints by later tectonic events. In hydrocarbon reservoirs, a stylolite may be permeable. As an example, hydraulic fracturing may reactive one or more structures, for example, to form a network.

As an example, a slickolite may be defined as being a type of stylolite in which the teeth are inclined at less than about 90 degrees to the plane of the stylolite. Slickolites may form at an angle to a1, for example, by dissolution along a preexisting fracture. Slickolites may be surfaces of shear displacement as well as shortening.

As an example, a type of fracture may be an artificial or induced fracture. Such a fracture may be defined as a rock fracture produced by human activities, such as drilling, accidental or intentional hydrofracturing, core handling, etc.

As illustrated in FIG. 4, a joint (e.g., a tension fracture) may provide information as to a direction of $\sigma_3$ while a stylolite (e.g., a compression fracture) may provide information as to a direction of $\sigma_1$. Thus, as an example, joints and/or stylolites may provide orientation information (e.g., local orientation information). As discussed further below, as an example, conjugate faults (e.g., shear fractures) may provide information, for example, where an angle between $\sigma_1$ and one of the faults may be related to an internal coefficient of friction.

As an example, using fractures and stylolites orientations for opening fractures (joints, veins, dikes) the orientation of the normal to a fracture plane may indicate the direction of the least compressive stress direction ($\sigma_3$). As an example, one or more normals (e.g., normal vectors) to pressure solution seams and/or stylolites may indicate the direction of the most compressive stress ($\sigma_1$). As an example, using measurements of orientations of fractures, pressure solution seams and/or stylolites, one may recover an estimation of the tectonic regime which generated such features (e.g., via an inversion method).

As an example, fault striations may be used as data for performing an inversion to recover information about a tectonic regime. As an example, magnitude information may be used as data for performing an inversion to recover information about a tectonic regime. As an example, GPS data and/or InSAR data (interferometric synthetic aperture radar) may be used for performing an inversion to recover information about a tectonic regime. As an example, flattened horizon data may be used for performing an inversion to recover information about a tectonic regime. As an example, dip-slip data (e.g., from seismology) may be used for performing an inversion to recover information about a tectonic regime. As an example, one or more types of data may be provided and optionally weighted (e.g., by type, etc.) for performing one or more inversions to, for example, recover information about a tectonic regime (e.g., paleostress, etc.).

Figure 5:
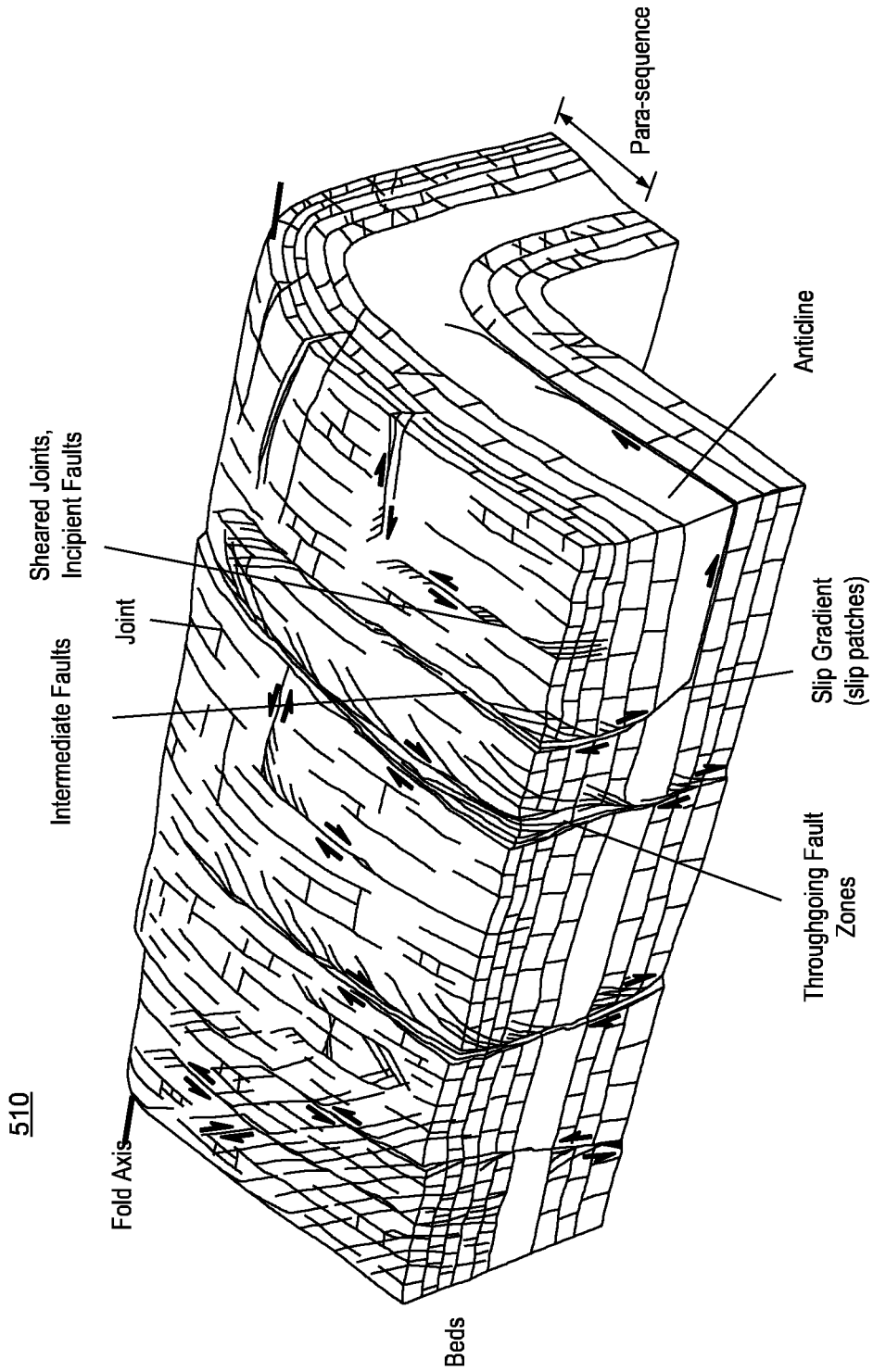
FIG. 5 illustrates an example of a portion of a geologic environment and various features.

FIG. 5 shows an example of a geologic environment 510 that includes various types of features set about an anticline that can define a fold axis. As shown, the geologic environment 510 includes beds, at least one parasequence, joints, sheared joints, incipient faults, throughgoing fault zones, intermediate faults, a slip gradient and slip patches. As an example, a substantially lateral path in the geologic environment 510 may pass through more throughgoing fault zones than a substantially vertical path.

As an example, an anticline may be defined as an arch-shaped fold in rock in which rock layers are upwardly convex. In such an example, the oldest rock layers can form a core of the fold, and outward from the core progressively younger rocks can occur. An anticline formation may act as a hydrocarbon trap, particularly when existing with reservoir-quality rock in a core and impermeable seals in outer layers. As an example, a bore may be drilled at least in part in a direction substantially parallel to fold axis (e.g., to produce hydrocarbon from a trap).

Types of folds may be analyzed via picked bedding planes' poles within a cylindrical or conical structure, which may align themselves on so-called great or small circles, in a stereonet view (e.g., a stereonet plot). For example, for a given structure, an approximation may be constructed via a cylinder or a cone.

As an example, dip readings interpreted on image data may be sequenced in a manner such that adjacent dips within a sequence are located along a great or a small circle (e.g., or close to it), which thus provides for illustrating an association with a particular structural element. As an example, structural elements may be reconstructed, for example, as may be seen in a vertical cross section through a geologic environment.

As an example, a substantially horizontal portion of a bore, a well, etc. may be characterized via one or more parameters. For example, consider a kickoff parameter, a heel parameter, a toe parameter. As an example, a substantially horizontal portion of a bore, a well, etc. may be characterized by a toe-up, a toe-down, etc. As an example, a heel may be a point in a horizontal bore trajectory where inclination angle reaches approximately 90 degrees. As an example, a toe may be a point that represents a depth of a horizontal bore. As an example, a toe-up profile may be achieved where inclination angle is more than about 90 degrees throughout a horizontal portion and a toe-down profile may be achieved where inclination angle is less than about 90 degrees in a horizontal portion. As an example, a substantially horizontal portion or a substantially lateral portion may be of an overall inclination angle of about 90 degrees; for example, consider an inclination angle in a range from about 75 degrees to about 105 degrees or, for example, in a range from about 80 degrees to about 100 degrees or, for example, in a range from about 85 degrees to about 95 degrees. As an example, a profile of a bore may be shaped in a manner that aims to maintain the bore in a pay zone or pay zones (e.g., to maximize exposure to a reservoir or reservoirs).

As an example, a bore may be drilled using a so-called horizontal drilling technique, which may be a subset of directional drilling techniques. As an example, a horizontal drilling technique may be implemented to achieve a bore with a portion that departs from vertical by about 75 degrees or more. As an example, horizontal drilling may be implemented to penetrate a greater length of a reservoir or reservoirs (e.g., in comparison to a vertical bore). For example, consider the geologic environment 510 of FIG. 5 where horizontal drilling may be implemented to drill a bore in a direction that is substantially parallel to a fold axis of the anticline. As mentioned, an anticline may act as a trap; noting that particular features can exist in such a formation (e.g., faults, natural fractures, joints, etc.). As an example, a horizontal drilling technique may be implemented to drill a bore with a lateral extent that may be in a reservoir formed in part due to a trap such as an anticline trap. In such an example, a lateral extent of the bore may pass through a plurality of faults (e.g., fault zones, etc.) and, where a sub-surface tool is disposed in the lateral extent of the bore, data may be acquired germane to the location of such faults. As an example, such sub-surface tool data may be analyzed for the location of at least one fault where a method may extrapolate the location a distance (e.g., or distances) and a direction (e.g., or directions) away from the lateral extent of the bore (e.g., for purposes of conditioning a geomechanical model, etc.).

As an example, a substantially lateral portion of a well may intersect one or more natural fractures, contact one or more resource containing formations, allow for generation of one or more hydraulic fractures, etc. Horizontal drilling may include use of equipment such as, for example, one or more of whipstocks, bottomhole assembly (BHA) configurations, instruments to measure the path of a bore in multiple spatial dimensions, data links to communicate measurements taken downhole to the surface, mud motors and special BHA components, including rotary steerable systems and drill bits. As an example, a geologic environment may include hydrocarbon gas (e.g., shale gas, etc.).

As an example, a method may include receiving information about a geologic environment such as, for example, the geologic environment 510, and performing an inversion process to recover tectonic stress. In such an example, the recovered tectonic stress may be used for purposes of planning, developing, etc. an environment. For example, one or more wells may be drilled according to a plan that is based at least in part on recovered tectonic stress. In such an example, a well may be drilled, completed, etc., to reduce risk of collapsed, may be drilled, completed, etc., to facilitate recovery of a resource and/or may be drilled, completed, etc., to facilitate a hydraulic fracturing process. As an example, tectonic stress information may facilitate generation of fractures that may form a fracture network. For example, consider performing fracturing via injection of fluid where fractures are formed that may "reactivate" natural fractures to form a fracture network that includes natural and artificial fractures.

Various stress inversion techniques to recover regional paleostress adhere to the Wallace-Bott hypothesis, which stipulates that when faulting occurred, shear stress resolved onto the fault plane had to be parallel to the slip vector produced and thus can be used to determine the stress tensor. The Wallace-Bott hypothesis may also be stated as: slip on faults occurs in the direction of maximum resolved shear stress; or shear traction applied on a given fault plane causes a slip in the direction and orientation of that shear traction, irrespective of faults created in an intact rock or along a pre-existing fracture. Further assumptions of the Wallace-Bott hypothesis include faults are planar, blocks are rigid, neither stress perturbations nor block rotations along fault surfaces occur and the applied stress state is uniform.

Figure 6:
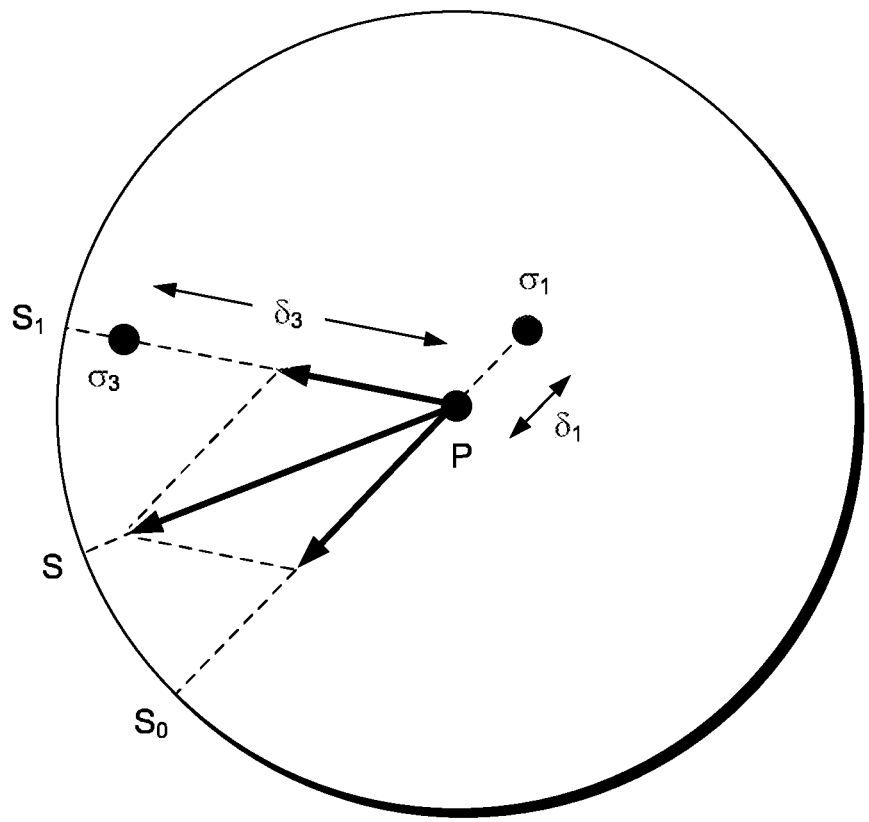
FIG. 6 illustrates an example of a plot and associated stresses.

FIG. 6 shows a stereonet plot 610 that illustrates a graphical technique (e.g., Means' method) to determine the slip direction of a fault whose pole is plotted at the center of the stereonet plot 610.

The graphical technique demonstrates that slip directions are directed away from the $\sigma_1$-axis and toward the $\sigma_3$-axis. If the fault in the stereonet plot 310 is nearly perpendicular to the $\sigma_2$-axis, the angles of lengths $\delta_1$ and $\delta_3$ are approximately equal to 90 degrees. Therefore, $a(1) \approx a(3) \approx 0$, though their signs depend on the tiny difference of the angles from 90 degrees. This further indicates that the slip direction, S, is swerved around the $\sigma_2$-axis.

Fault-slip data act to constrain the state of stress that is responsible for faulting. However, some stress components are not determined. The Wallace-Bott hypothesis indicates that slip directions are not affected by pore fluid pressure, although it may control the strength of faults. The effective stress may be given by the following equation: $\sigma' = \sigma - pI$. In such an approach, the slip direction $\sigma'$ is the linear combination of those by $\sigma$ and $-pI$. However, the latter is an isotropic stress and causes no shear traction. Therefore, the pore fluid pressure does not affect the slip direction of a fault. Such an approach may be convenient for paleostress analysis as pore fluid pressure on a fault surface when the fault moved may be difficult to ascertain.

The slip directions predicted by the Wallace-Bott hypothesis for the stresses $\sigma$, and $\sigma = q\sigma_0 - pI$, are the same for a given fault, whether or not p and q are interpreted as pore pressure and depth; noting that when the state of stress is illustrated by Mohr circles, p and q indicate the position of the circles on the abscissa and the size of the circles, respectively. A Mohr circle is a two-dimensional graphical representations of the transformation law for the Cauchy stress tensor where the abscissa ($\sigma$) and ordinate ($\tau$) of each point on a circle are the magnitudes of the normal stress and shear stress components, respectively (e.g., acting on the rotated coordinate system). Thus, a circle is the locus of points that represent the state of stress on individual planes at their orientations, where the axes represent the principal axes of the stress element.

Due to the insensibility of the slip direction to associated parameters, fault-slip is not sufficient to constrain mean and differential stresses. However, it can be convenient for paleostress analysis, because it is possible to proceed without the depth and pore fluid pressure when each fault was activated.

As mentioned, it can be possible to determine the state of stress from fault-slip data via an inversion process. For example, a classical stress inversion process based on the Wallace-Bott hypothesis may be applied, which is non-linear because the slip direction is denoted by the unit vector $\sigma_S/|\sigma_S|$ (e.g., non-linearity resulting from the division). For example, an equation may provide for a measure of misfit of an assumed stress state to a data set for a given number of faults and a monotonously decreasing function. In such an approach, the measure depends on the data and the principal orientations and stress ratio. The optimal state of stress can be determined by maximizing the measure of misfit (e.g., an object function). The optimal stress determined by such an approach to stress inversion has uncertainty resulting from the independence of the slip direction from p and q.

Consider the following equation for the stress tensor $\sigma_0$, which includes the orthogonal tensor R and the stress ratio $\phi$:

$$\sigma_0 = R^T \begin{pmatrix} 1 & 0 & 0 \\ 0 & \Phi & 0 \\ 0 & 0 & 0 \end{pmatrix} R$$

The tensor defined by the foregoing equation may be determined via optimal principal orientations and optimal stress ratio as obtained by an inverse technique.

Various techniques employ slickenlines on fault planes and assume, according to the Wallace-Bott hypothesis, that the sampled faults slipped in a homogeneous stress field with no mechanical interactions nor polyphase tectonic loading. Evidence such as the reactivation of fault planes, faults with heterogeneous orientations of slip tend to be rather common in nature and are not compatible with a single tectonic phase. Fault-slip data that are explained by more than one tectonic stress have been called heterogeneous. A monophase inversion techniques may lead to spurious solutions, and in various instances, the inversion may yield a solution that is not wholly compatible with one or more homogenous subsets; rather being a compromise between subsets.

To address a clustering problem in the taxonomy field, a numerical iterative technique based on dynamic cluster analysis may be implemented that separates heterogeneous sets of data into subsets. Such an approach may be implemented to analyze the dynamics of faulting as it may separate fault slip data into subsets corresponding to different tectonic events. An approach may be implemented for separating phases from heterogeneous fault-slip data and, for example, an approach may be based on cluster analysis, a graphical procedure, a multiple inverse method, etc., for analyzing heterogeneous fault-slip data sets.

As to techniques for heterogeneous stress inversion that deal with heterogeneous datasets, consider: (1) those that clusterize slip data into datasets by analyzing the compatibility of the slip data before inversion; (2) those that search stress tensors that explain part of the dataset solely; (3) those that use an altered misfit function so that it integrates the data clustering during a minimization process; and (4) those that compute the stress tensor for each fault slip data and try to minimize the resulting variety of stress tensor variation.

The first category (1) includes clustering of data that yield similar misfits with various trial stress tensors using the right-dihedra. Another approach to separate heterogeneous data into subsets is to represent the slip data in a two dimensional graphic analysis. Such an approach involves one of the principal stress directions being assumed to be vertical to simplify the 4D problem into a 2D problem. Clustering may be achieved using the y-R technique, or a spherical plot version, or a superposition of a modified Breddin's graph to a rake versus strike plot of the data.

In the second category (2), an approach can compute the misfit function solely for subsets of size N with the smallest misfits, with N chosen as a percentage of the data. Another approach can clusterize data into subsets of size N and systematically run stress inversion. Yet another approach can spot the stress tensors that minimize the misfit below a chosen threshold for N data.

In the third category (3), an approach may use a misfit function that reduces the influence of outliers by using lower order misfit functions. Another approach to reduce the influence of a large subset of outliers that are related to secondary phases, can modulate the misfit criteria by a function that cuts it when it becomes large, or in a hard division scheme, a triangular function, or a Gaussian function.

The forth category (4) can share some aspects of the y-R technique and can include exploring stress tensor orientations for individual slip datum and computing the stress ratio R so that it matches the observed slip direction. In such an approach, solution tensors are those with the least variation on a subset of the data.

Various polyphase techniques (e.g., y-R, dihedra, direct inversion, etc.) as applied to the polyphase Ogmore data set indicate that spurious solutions may result as well as artifact stress tensors. Geological expertise, thus, may be employed where an automatic polyphase technique may yield uncertain results.

Within the oil and gas industry, scenarios can exist that involve multiple tectonic phases and unknown mechanical fractures type.

Knowledge of a heterogeneous paleostress field can assist with prediction of natural fractures. As slip along fault planes tends to be seldom observed in a wellbore, natural fractures (e.g., joints, faults, stylolites, etc.) tend to be taken into account during inversion of stresses.

Natural fractures orientation can be affected by the stress perturbation around complex fault systems. In such conditions, using the Wallace-Bott hypothesis may lead to unreliable results and, in some instances, geomechanical models may yield better results. For example, consider a numerical model of rock deformation based on continuum mechanics for modeling natural fractures in a reservoir. Adding a geomechanical rationale to statistical techniques may improve predictive capability and leads to more realistic fractured reservoir models.

As an example, a framework such as, for example, the iBem3D™ framework, can be implemented to perform a stress analysis. Such a framework can allow for use of various kinds of deformation data (e.g., slickenlines, joints and veins, shear fractures, deformation bands and faults, stylolites and compaction bands, focal mechanisms, inSAR data, GPS data, fold hinges, etc.).

A reservoir in a geologic environment may have undergone multiple tectonic phases, for example, resulting in a variety of fracture data orientations (e.g., joints, shear fractures, stylolites, etc.). Determination of fracture kinematics observed along a wellbore may be challenging as fractures may be interpreted as joints since shear is hardly observed. In a geologic environment that includes fluid, knowledge of fracture kinematics can help predict fluid migration.

As an example, an approach to tectonic stress inversion can include data clustering and can include geomechanical modeling to perform polyphase inversion. In such an example, the approach may invert simultaneously for unknown fractures kinematic type.

As an example, a method can include data clustering and geomechanical modeling for polyphase inversion, optionally where inversion provides for identification of one or more kinematic types. As such a method may separate fracture types during an inversion process, a reservoir engineer may predict fracture distribution and orientation as well as fracture permeability through the rock mass for reservoir fluid flow simulations. For example, output of an inversion method may be input to a reservoir simulator (e.g., a reservoir simulation framework, etc.). As an example, output from a framework may be used in planning, performing, etc., one or more field operations, etc.

Figure 7:
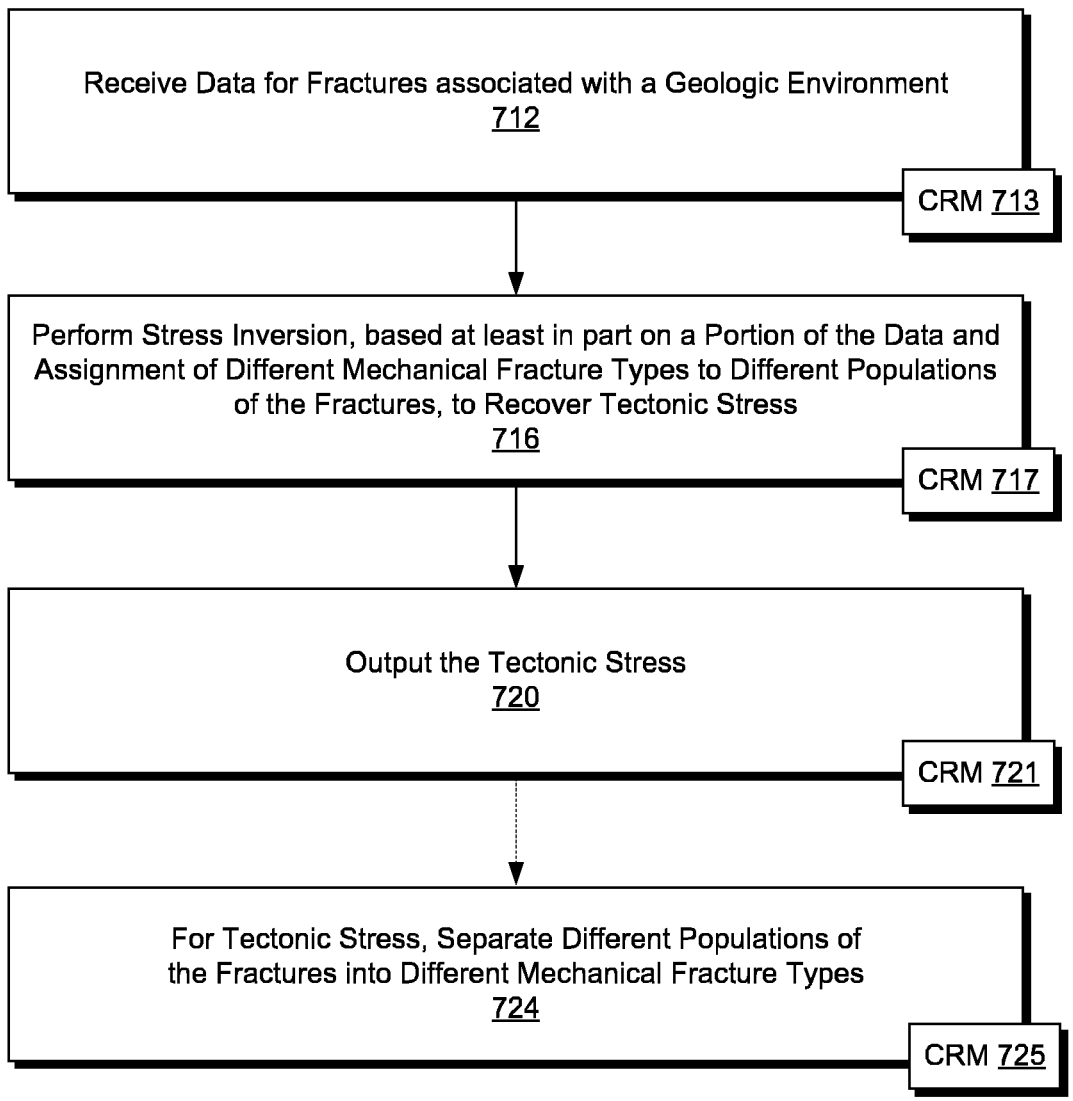
FIG. 7 illustrates an example of a method.
Figure 7:
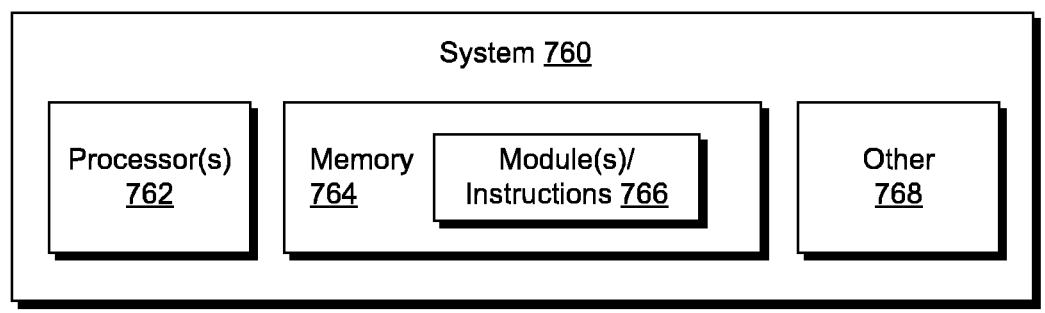

FIG. 7 shows an example of a method 710 and an example of a system 760. As shown, the method 710 includes a reception block 712 for receiving data for fractures associated with a geologic environment; a performance block 716 for performing stress inversion, based at least in part on a portion of the data and assignment of different mechanical fracture types to different populations of the fractures, to recover tectonic stress; an output block 720 for outputting tectonic stress; and an optional separation block 724, for the tectonic stress, separating different populations of the fractures into different mechanical fracture types. As an example, a tectonic stress can be a paleostress or, for example, associated with activity such as artificial fracturing (e.g., hydraulic fracturing).

As an example, the method 710 may optionally include applying one or more confidence criteria. In such an example, one or more of the confidence criteria can include one or more parameters associated with mechanical fracture type. For example, a confidence criterion can include a parameter for a first mechanical fracture type and a parameter for a second mechanical fracture type (e.g., and optionally one or more additional mechanical fracture types).

The method 710 can include outputting a plurality of tectonic stresses where each of the tectonic stresses may be associated with a tectonic phase. As an example, the method 710 can include outputting a tectonic stress associated with a first tectonic phase and outputting another tectonic stress associated with another tectonic phase. In such an example, the method 710 can be a polyphase or multiphase stress inversion method.

In the method 710, assignment of different mechanical fracture types to different populations of the fractures can include randomly assigning different mechanical fracture types. For example, for given fractures (e.g., with associated location data), the method 710 can include randomly assigning a first percentage of the fractures a first mechanical fracture type and a second percentage of the fractures a second mechanical fracture type. Such a method may also include randomly assigning a third percentage of the fractures a third mechanical fracture type, etc. As an example, mechanical fracture types can include one or more of joint, stylolite and shear. For example, FIG. 4 shows some examples of orientation information with respect to fractures 410, which may include a tension fracture 420 (e.g., a joint), a shear fracture 430 and a compression fracture 450 (e.g., a stylolite). As an example, the fractures 420, 430 and 450 may be referred to as mechanical fractures and their associated monikers may be considered mechanical fracture types (e.g., tension or joint, shear, compression or stylolite, etc.). As an example, a confidence criterion may include one or more of a joint parameter, a stylolite parameter and a shear parameter.

As an example, data for fractures can include information such as, for example, orientation information. As mentioned, data for fractures can include information such as, for example, location information. As an example, data for fractures can include dip information. As an example, data for fractures can include location information, which may be location information defined with respect to a feature of a geologic environment. For example, data for fractures may define fractures as being a direction to one side of a fault and may define other fractures as being to another direction to another side of the fault.

As an example, the method 710 can include randomly assigning a mechanical fracture type (e.g., joint with x percent, stylolite with y percent and/or shear with 100−x−y percent) to N fractures to provide three different populations of fractures with different mechanical fracture types. In such an example, the number of fracture, N, may be at least two. As an example, the method 710 can include assigning at least two different mechanical fractures types to provide at least two different populations of fractures with different mechanical fracture types.

In FIG. 7, the system 760 can include one or more processors 762, memory 764, one or more modules and/or instructions 766 and other features 768 (e.g., one or more features of a computing platform such as a desktop computer, a laptop computer, a server, a workstation, etc.).

The method 710 is shown in FIG. 7 in association with various computer-readable media (CRM) blocks 713, 717, 721, and 725, which may be one or more modules. Such blocks can include instructions suitable for execution by one or more processors (or cores) to instruct a computing device or system to perform one or more actions. While various blocks are shown, a single medium may be configured with instructions to allow for, at least in part, performance of various actions of the method 710. As an example, a computer-readable medium (CRM) may be a computer-readable storage medium that is non-transitory and not a carrier wave.

As an example, mechanical fracture types can include joint, stylolite, and shear. As an example, a method can invert for multiple tectonic phases and can estimate mechanical fracture type, for example, where type may be unknown or uncertain for one or more fractures.

As an example, a method can optionally include receiving information pertaining to fault geometry for one or more faults. As an example, a method can include receiving information such as, for example, fracture orientation and location for at least two fractures. As an example, additional information may be received. As an example, information may be one-dimensional, two-dimensional, three-dimension, etc.

As an example, a method can include outputting "n" tectonic phases for which unknown data mechanical type are recovered and classified in one or more of the "n" tectonic phases.

As an example, a method can include, for fractures with unknown or uncertain mechanical type, randomly assigning x percent of the fractures to be joints, y percent of the fractures to be stylolites and (100–x–y) percent of the fractures to be shear fractures.

As an example, a method can include selecting a fracture from a group of fractures (e.g., a data list for fractures); performing a mechanical stress inversion with the selected fracture as a constraint to recover a stress $\sigma_R$; for at least one of the non-selected fractures, computing an associated cost using the stress $\sigma_R$ where the lower the cost the better the match to mechanical type according to $\sigma_R$; creating a subset of fractures for which the cost is lower than a prescribed threshold (e.g., a user prescribed threshold, a default threshold, an adjustable threshold, etc.); performing stress inversion using the fractures from the subset (e.g., to refine $\sigma_R$), and remove fractures of this subset from the group of fractures.

As an example, the aforementioned method may be repeated until a number of fractures have been processed, until a number of fractures remain, until the fractures in the group of fractures have been processed, etc. As an example, an iteration parameter may specify a maximum number of iterations.

As an example, a method can include plotting a subset (e.g., $\sigma_R$ and fracture and type) in a tectonic stress domain. For example, a subset may be plotted as a point where, for example, size (e.g., or other indicator) is proportional to a confidence criterion.

As an example, where clusters represent a number of tectonic phases, a method can include discarding certain fracture type information (e.g., as desired or applicable), and for an individual tectonic phase ($\sigma_R$), for individual fractures, get the fracture type with the lowest cost. In such an example, if the cost is lower than a prescribed cost, then the fracture with its type may be considered as "being explained" by $\sigma_R$. Where a fracture is so explained (e.g., at or below a certain cost, etc.), it may be removed from the group of fractures. Such a method may be referred to, for example, as a fracture-type-cost algorithm.

As an example, a method can include selecting a largest cluster, applying the aforementioned fracture-type-cost algorithm and repeating a tectonic stress inversion algorithm, for example, until a desired number of fractures are explained. For example, if a method ends up with n tectonic events and an imposed maximum of events is m (e.g., m n), then remaining fractures may be set to "unknown" (e.g., or uncertain, etc.).

Example Pseudocode

An example of pseudocode appears below for various examples of algorithms.

```
A. Provide data for N fractures with unknown or uncertain mechanical type in a
geologic environment;
B. Provide information as to a fault system in the geologic environment;
C. Find at least one or more unknown or uncertain tectonic phases associated
with the geologic environment by, for example, performing the following:
    1. Randomly assign a mechanical type (e.g., joint with x percent, stylolite
    with y percent and/or shear with (100-x-y percent)) to the N fractures
    2. Algorithm X
        a. While N contains fractures, do
            i. Pick randomly 1 fracture
            ii. Perform stress inversion → σ_R
            iii. Compute the cost C_f for each fracture f using σ_R
            iv. Create a new subset S
            v. For fractures f
                1. If C_f < C_user put f in a subset S
            vi. EndFor
            vii. Redo stress inversion using fractures from S → refined
            σ_R
            viii. Remove fractures of S from N
        b. EndWhile
    3. Call Algorithm X n times, where n < N is a prescribed number of
    iterations
    4. Results include M subsets, a subset including (i) the tectonic phase and
    (ii) a set of fractures with their randomly imposed type.
    5. Plot at least one or more of the subsets in a stress domain, optionally
    using one or more confidence criteria (e.g., to detect clusters where a
    cluster corresponds to a detected tectonic phase).
D. Separate Fracture Types
    6. Algorithm Y (e.g., optionally phase by phase)
        a. For fractures in N
            i. Discard the mechanical type of each fracture
            ii. For one or more tectonic phases σ_R
                1. For fractures in N
                    a. Get the fracture type T with the lowest cost C
                    b. If C < C_user then the fracture with its type T is
                    "explained" by σ_R and the fracture can be
                    removed from N
                2. EndFor
            iii. EndFor
        b. EndFor
    7. If the clusters adequately represent the tectonic phases
        a. Call Algorithm Y
```

8. Else
   a. While N fractures are not explained
      i. Select a largest subset (e.g., as displayed in the tectonic stress domain)
      ii. Call Algorithm Y on selected subset and then call Algorithm X
      iii. Remove the subset from N and from the stress domain
   b. EndWhile
9. EndIf As an example, a method can be applied to a synthetic model, for example, composed of three tectonic phases with generated joints, shear fractures and stylolites. As an example, a method can be applied to a model associated with a geologic environment, for example, consider an environment such as La dalle des Matelles (Montpellier, France).

As an example, a method can be applied to natural and/or artificial fractures in a geologic environment. As an example, a method can be applied to synthetic natural and/or artificial fractures. As an example, a method can be applied to fractures that include actual fractures in a geologic environment and synthetic fractures, optionally including one or more hydraulic fractures to be created in the geologic environment.

As an example, a method may implement the iBem3D™ framework for constructing a model that includes elements that may be solved via a boundary element method (BEM) for an elastic isotropic and heterogeneous domain. As an example, faults may be constructed as 3D discontinuities in a homogeneous elastic medium where the medium itself, internally, may be handled without being discretized (e.g., triangulated, etc.).

Tectonic stress inversion using a framework such as, for example, the iBem3D™ framework, may apply a principle of superposition to linear elasticity for heterogeneous, isotropic whole-of half-space media. In such an example, given measures of one or more of fault throw, dip-slip, slickenline directions, stress measurements, fault geometry, GPS data, InSAR data, fractures (e.g., joints, veins, dikes, pressure solution seams with stylolites, etc.), micro-seismicity, breakout orientations or secondary fault plane orientations, the iBem3D framework may recover the remote stress state for multiple tectonic events (e.g., via modeling of a complete mechanical scenario).

As an example, consider a scenario where one principal stress is vertical; noting that other examples may operate without such an arrangement. In such an example, a tectonic stress domain may be defined and used to analyze stress inversion results.

Figure 8:
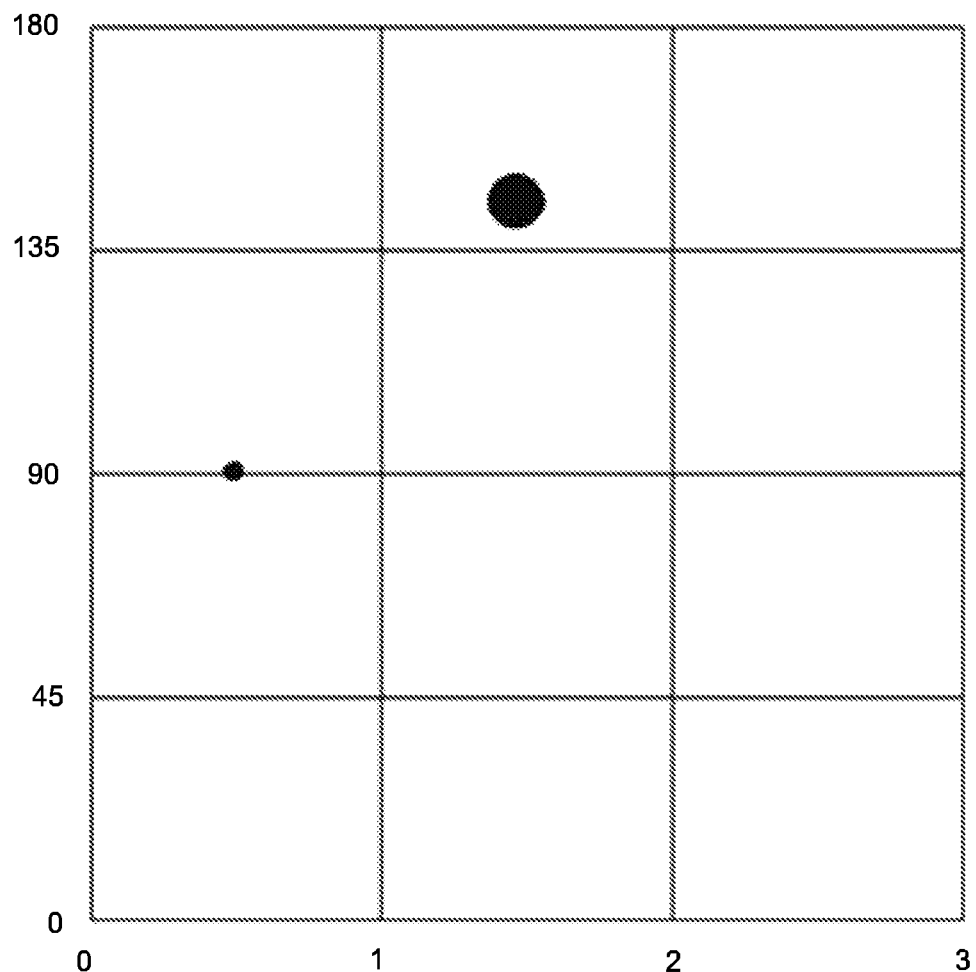
FIG. 8 illustrates an example of a plot in a tectonic domain.

FIG. 8 shows an example of a plot 810 of a tectonic stress domain as a 2D parameter space that may cover various Andersonian tectonic configurations. In the plot 810, the x-axis represents the stress ratio R (e.g., between 0 and 3); whereas, the y-axis represents orientation $\theta$ (e.g., between about 0 degrees and about 180 degrees) of the maximum principal horizontal stress defined clockwise according to the North. Specifically, the tectonic stress domain in FIG. 8 illustrates two results of stress inversion simulations $A(\theta=90° N, \overline{R}=0.5)$ and $B(\theta=145° N, \overline{R}=0.5)$. The tectonic stress domain can be for polyphase inversion where, for example, dots can represent tectonic phases retrieved after clustering a fractures dataset. For example, in the plot 810 the two dots represent two tectonic phases retrieved after clustering of a fractures dataset where each of the dots has a corresponding surface area that may be defined by a confidence criterion. For example, the dot for the simulation A has a different area than the dot for the simulation B. Such an approach may allow an individually to readily determined confidence for a simulation, particularly with respect to one or more other simulations.

As mentioned, as an example, a method can include data clustering stress inversion and type separation (e.g., separation as to mechanical fracture type).

As an example, a method can employ cluster analysis for fracture separation. For example, consider cluster analysis as a statistical technique for identifying groups from within a sample. Such an analysis may be performed in a plurality of stages, for example, depending on knowledge of one or more fracture types along a length of a well, desired results, etc.

As an example, a method can include where fracture data type is not defined, assigning a random type to individual fractures in a group of fractures, for example, according to a fixed proportion (e.g., as may be user defined, by default, etc.). As an example, consider proportions such as one-third joints, one-third stylolites and one-third shear fractures. As an example, where data for fracture type exists, such data may be used to assign type (e.g., for at least a portion of the fractures).

As an example, a method can include randomly or otherwise selecting a fracture (e.g., described in terms of dip-azimuth, dip angle and type) and performing a mechanical stress inversion using the selected fracture as a constraint to output a tectonic stress.

As an example, a tectonic stress output from an inversion may be applied in a forward sense to a model and, for example, one or more individual predicted fracture orientations may be compared to one or more individual observed fractures. Such an approach can provide the cost of remaining fractures where, for example, the lower the cost, the higher the similarity to the randomly selected fracture. As an example, a threshold value (e.g., consider a value of about 0.1) may be used to classify mechanically similar fractures into a subset.

As an example, a method can include repeating various actions until a desired portion of data is clusterized into subsets. As an example, one or more individual subsets may be analyzed separately, for example, using a geomechanical monophasic stress inversion technique. As an example, an individual stress inversion solution may be plotted in a tectonic stress domain, for example, as a dot with a particular area, color, etc. As an example, dot area may be proportional to a confidence criterion based on a fracture subset size and data type diversity.

As an example, if one or more plotted solutions are considered to be acceptable (e.g., by a geologist, etc.), one or more of the plotted tectonic phase solution may be used in a forward simulation and the locally perturbed stress tensor compared to fractures from, for example, original data (e.g., received data for a group of fractures, etc.). As an example, a modified cost function may be used on individual fracture planes to determine a corresponding fracture type for at least one of the individual fracture planes. In such an example, where cost is lower than a threshold value (e.g., consider a threshold value of about 0.1), the one or more identified fractures may be removed from the original data (e.g., from a group of fractures) and associated to the selected tectonic phase solution.

As an example, where one or more possible solutions are plotted with corresponding confidence criteria, a tectonic stress solution (e.g., corresponding to a tectonic phase) may be selected and applied in a forward sense. As an example, a modified cost function may be used on a fracture plane to determine its fracture type. In such an example, where the cost is lower than a threshold value (e.g., consider a value of about 0.1), one or more identified fractures may be removed from (e.g., from a data set) and associated to the selected tectonic phase solution. As an example, a method can include iterations where various actions are repeated until a desired portion of received fracture data is associated to one or more tectonic phases.

As an example, if one or more yielded tectonic phases appear unrealistic, uncertain, etc., a method may include adjusting an assignment of fracture types (e.g., using one or more different types, one or more different percentages, etc.).

As an example, a multi-stage approach can allow for one or more of geomechanically clusterizing data into subsets prior to stress inversion; filtering recovered stress inversion results with a confidence criterion; and recovering the mechanical type of each fracture and associate it to a tectonic phase.

As an example, a confidence criterion may include terms that correspond to one or more types of features. For example, consider a confidence criterion for an individual cluster of fractures that may be represented as follows:

$$Confidence_1 = \frac{1}{\sqrt{(found_j nb_j)^2 + (found_s nb_s)^2 + (found_c nb_c)^2}}$$

where $found_{type}$ is a number of fractures of a defined type clusterized into subsets and $nb_{type}$ is a number of fractures in a dataset of a defined type. As an example, consider type as being one or more of j for joint, s for stylolites and c for conjugate fractures, which may be referred to as shear fractures.

A confidence metric may represent the 'distance' of a point for which coordinates are defined by a successfully clusterized number of fracture data of a selected number of types ($found_{type}$) from an optimum scenario where a clustering method finds data of each type, in which case, the following may hold $Confidence_1 = 0$.

Once data are clusterized in subsets, another confidence criterion that considers fracture types heterogeneity may be used, for example, consider the following equation:

$$Confidence_2 = \left(\frac{1}{Confidence_1 Min_{confidence_1} + 1} \times nb_{all}\right)^2$$

where $Min_{confidence_1}$ is the minimum value of $Confidence_1$ for processed subsets and $nb_{all}$ the total number of fractures in a dataset.

As an example, a third confidence criterion may be used, for example, that takes a missing fracture type into account is:

$$Confidence_3 = Confidence_2 H$$

where H depends on a number of fractures of each type, for example, consider an approach where data includes three types of fractures:

$$H = nb_j \times nb_s \times nb_c$$

where data includes two types of fractures:

$$H = nb_{type1} \times nb_{type2}$$

and where data includes one type of fracture:

$$H = nb_{type}$$

Referring again to the plot 810 of FIG. 8, two clusters are illustrated and correspond to tectonic stress inversion that yielded geologically sound solutions; noting that unsound solutions have been filtered by implementation of a confidence criterion such as, for example, $Confidence_3$.

Figure 9:
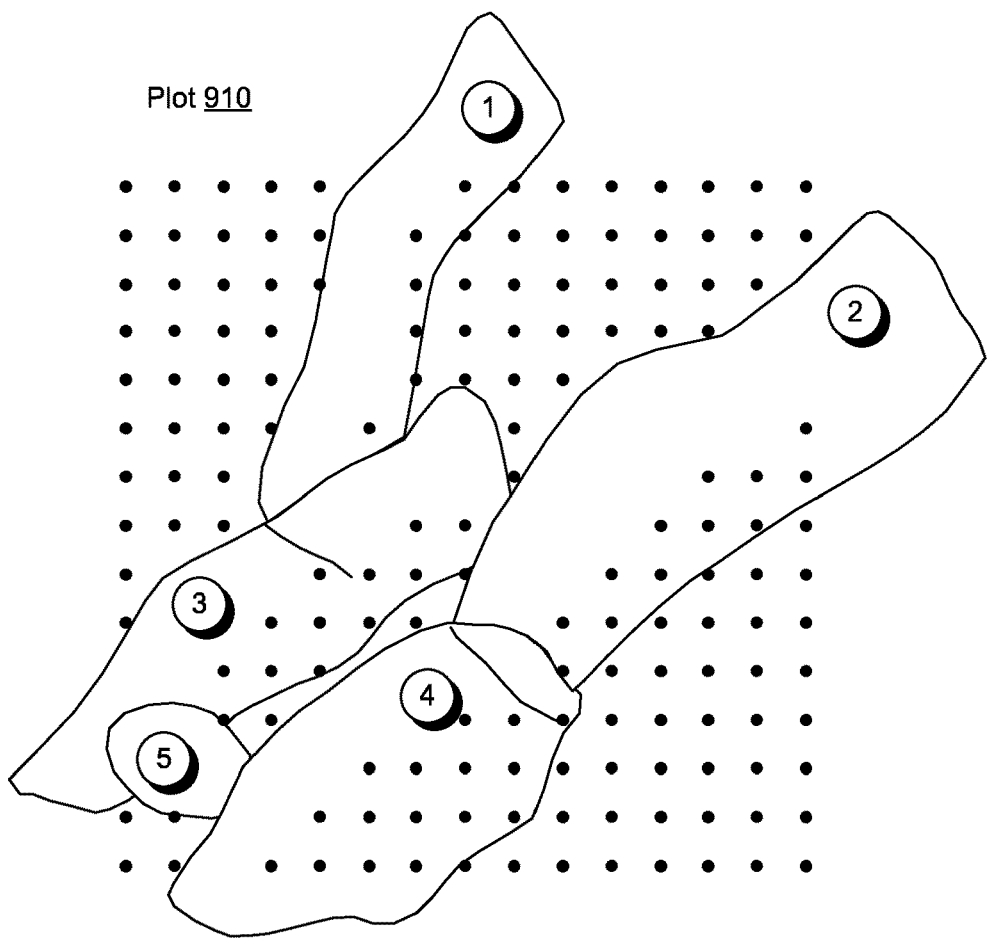
FIG. 9 illustrates an example of a table and an example of a plot of a synthetic model.

FIG. 9 shows an example of a table 905 and an example of a plot 910 that correspond to a synthetic model of a geologic environment. As an example, a method may be applied to a synthetic model and associated data. For example, consider a synthetic model that includes 5 intersecting active faults as shown in the plot 910 of FIG. 9 (see, e.g., faults numbers 1 to 5). In such an example, imposed to the model may be three tectonic phases as set forth in the table 905 where, for each tectonic phase (e.g., Andersonian), the model is populated with features such as, for example, a randomly generated population of ⅓ of joints, ⅓ of stylolites and ⅓ of shear fractures. In the plot 910, the dots spatially represent such features on a grid (e.g., due to the slipping faults).

In the foregoing approach to a synthetic model, grid results include orientation of the randomly generated joints, stylolites and shear planes generated from three tectonic phases. To proceed with tectonic stress inversion, information for the mechanical type of each fracture is removed to provide a reduce set of information.

Given the synthetic model and associated data, a method can be applied to invert for parameters of the three tectonic phases (see, e.g., the table 905) as well as, for example, for the type of a feature. Such a method can include, for example, receiving orientations and fault geometry and then performing an inversion process for the parameters of the three tectonic phases as well as, for example, the type of a feature (e.g., mechanical fracture type, etc.).

Through use of a synthetic model and associated data, a method may be examined, for example, as to its robustness and performance. Again, as illustrated in the plot 910, the synthetic model is a fault model that is suitable for polyphase stress inversion and type separation. The fault model in the plot 910 includes three-dimensional fault geometry and a grid of dots that include 225 instances of randomly generated fracture data with random type.

Figure 10:
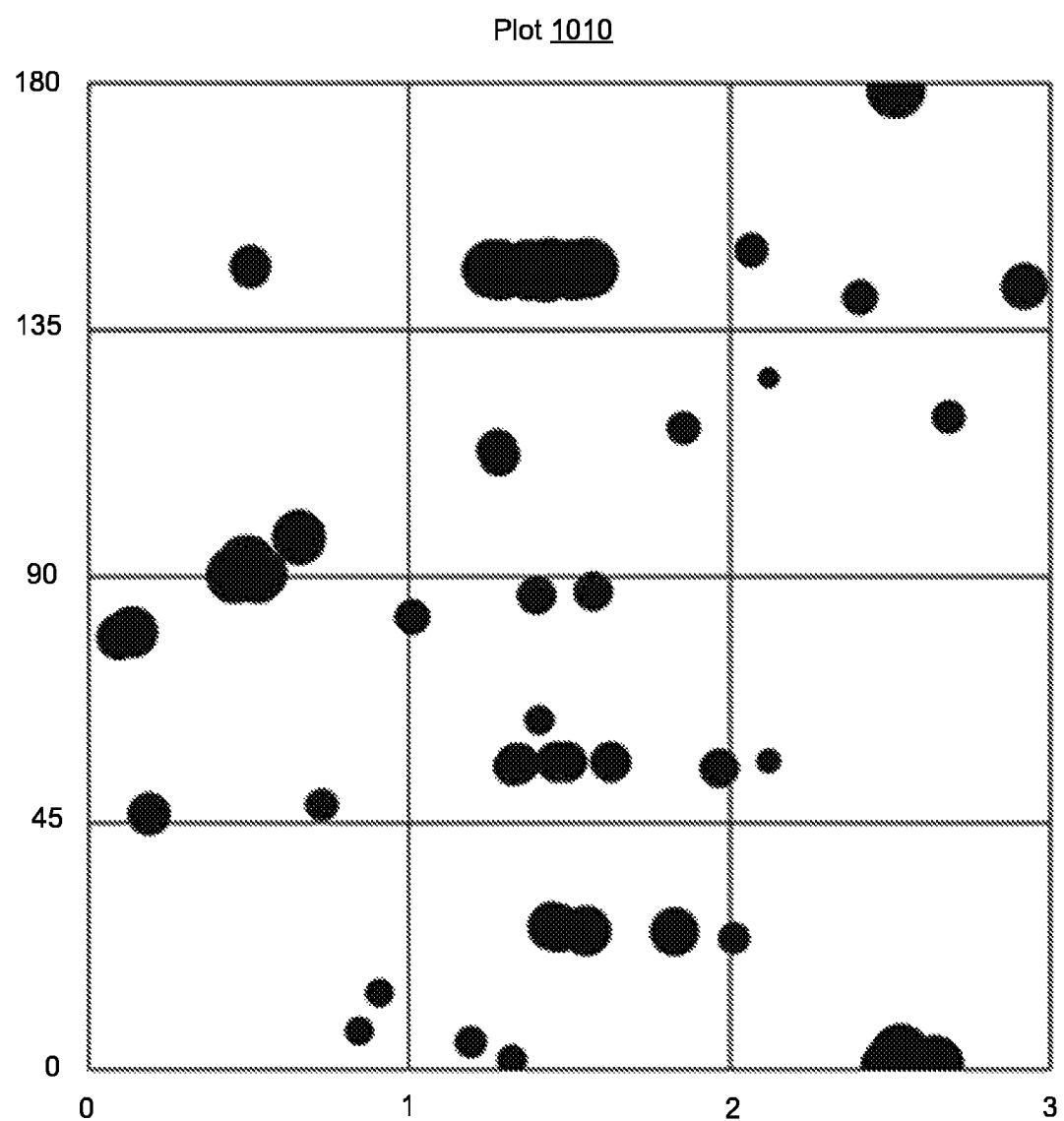
FIG. 10 illustrates an example of a plot in a tectonic domain.
Figure 10:
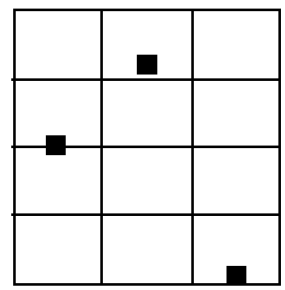

FIG. 10 shows a plot 1010 of a clusterization result using no confidence criterion along with a plot 1005 that approximates locations of the three tectonic phases of the table 905 of FIG. 9. As shown in the plot 1010, the dot area represents a number of data in a clusterized subset. The result shown in the plot 1010 includes multiple artifacts (e.g., unsound solutions).

Figure 11:
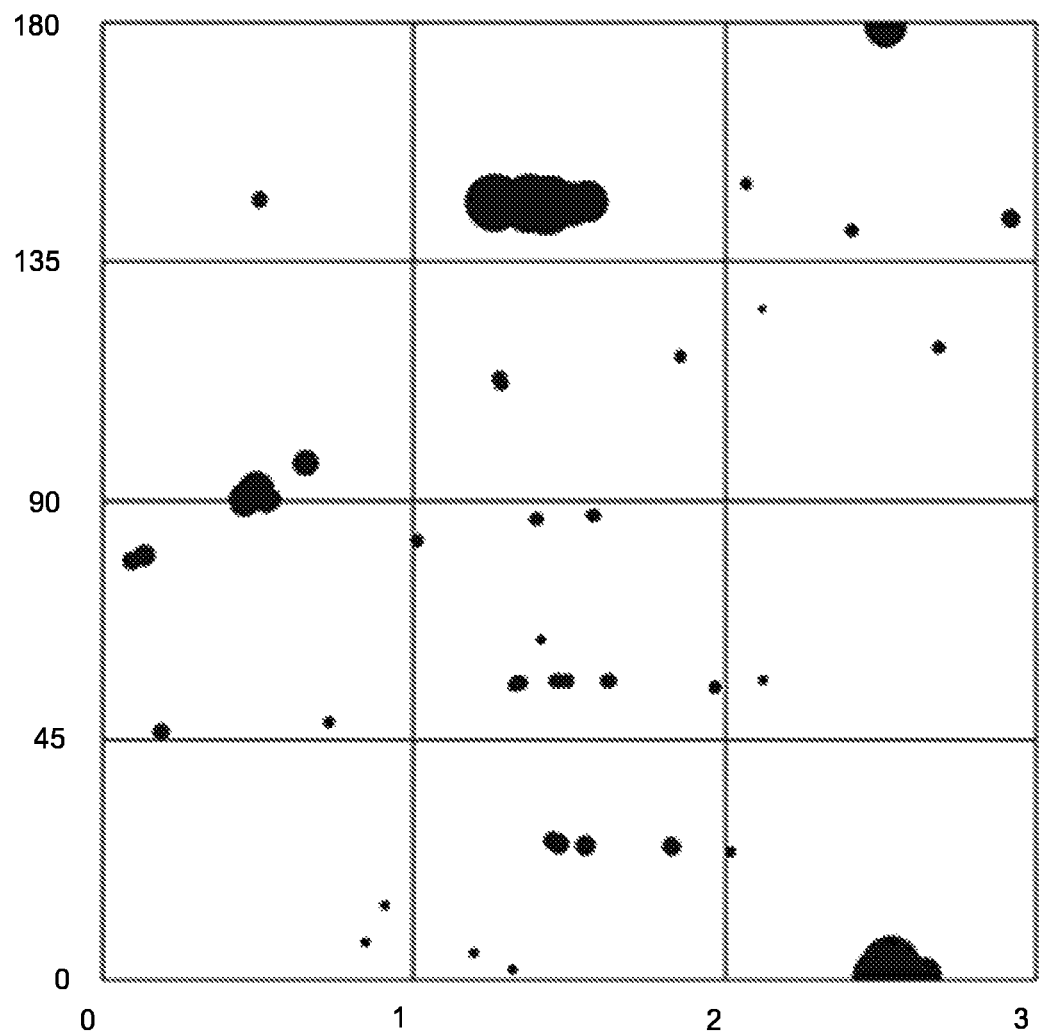
FIG. 11 illustrates an example of a plot in a tectonic domain.
Figure 11:
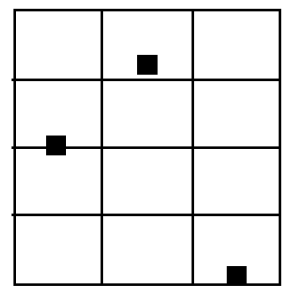

FIG. 11 shows a plot 1110 of a clusterization result using the aforementioned $Confidence_3$ criterion along with a plot 1105 that approximates locations of the three tectonic phases of the table 905 of FIG. 9. In the plot 1110, the three imposed tectonic stresses of the table 905 can be observed (e.g., recovered) while artifacts as illustrated in the plot 1010 are less visible.

An analysis of the information in the plot 1110 demonstrates that the applied method successfully recovered a majority (about 80 percent) of the mechanical fracture types and their respective tectonic phase.

Next, for purposes of separation, a method is applied to the synthetic model and associated data as in FIG. 9; noting that to better represent the type separation results, tectonic phases 1 and 2 of the table 905 are applied.

To impose the first tectonic phase, $1(\theta=90°, \overline{R}=0.5)$, a method includes randomly generates ⅓ of joints, ⅓ of stylolites and ⅓ of shear fractures on to the odd points of the grid shown in the plot 910 of FIG. 9 (black dots) as being due to slipping faults; and, the second tectonic phase, $2(\theta=145°, \overline{R}=1.5)$ is imposed where random fractures types are randomly generated on to the even points of the grid shown in the plot 910 of FIG. 9.

In the foregoing approach, synthetic data are generated where each point of the grid in the plot 910 is assigned a fracture of a randomly defined type that belongs to a particular tectonic phase where half of the grid points include fracture types generated by the tectonic phase 1, while the other half include fracture types generated by the tectonic phase 2. As an example, the given the synthetic data, a clustering process and a stress inversion on each recovered data subset (stages 2 to 5) may be performed.

Figure 12:
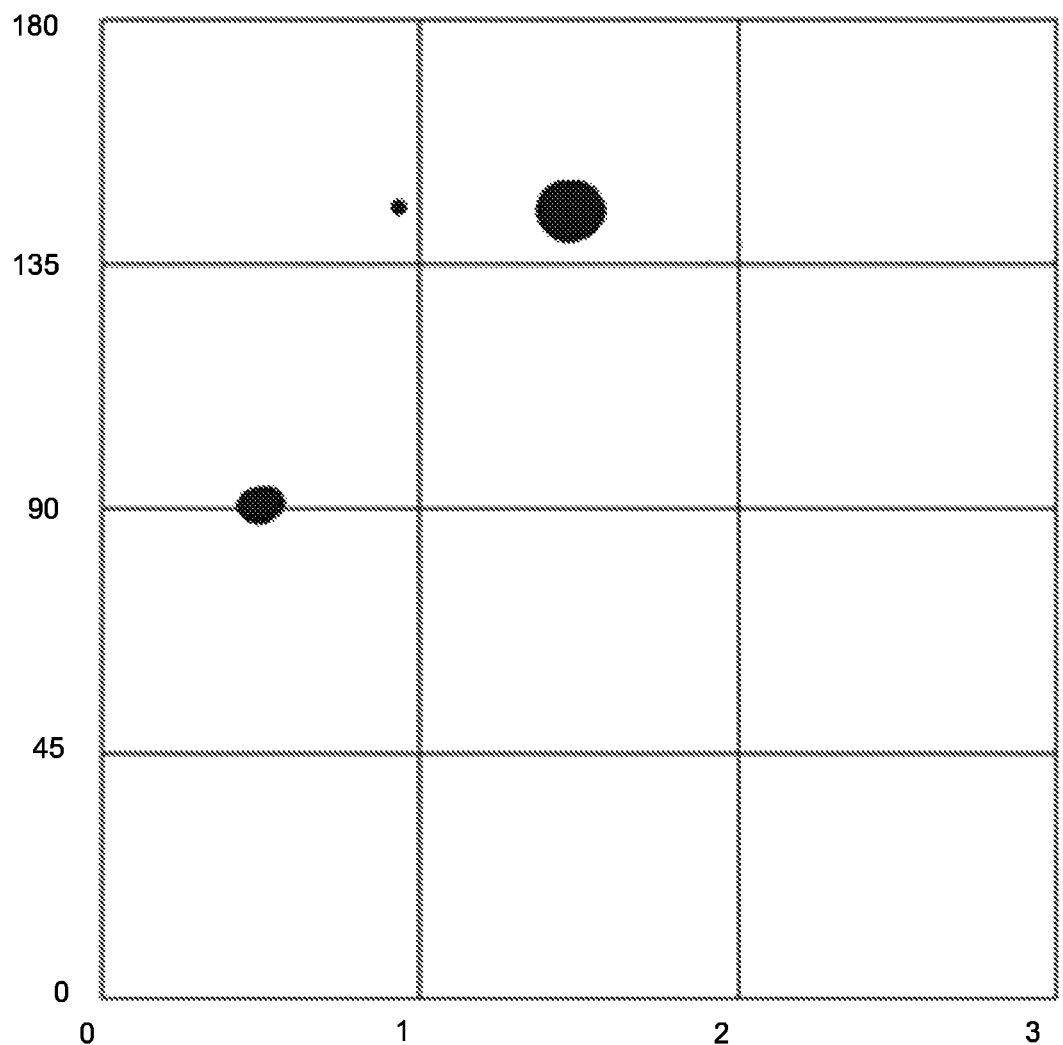
FIG. 12 illustrates an example of a plot in a tectonic domain.
Figure 12:
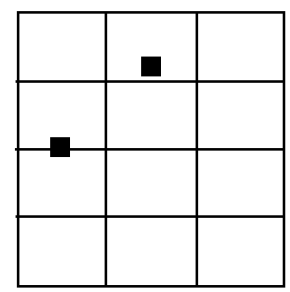

FIG. 12 shows a plot 1210 of recovered tectonic phases along with a plot 1205 of the two tectonic phases used to generate the synthetic data. Thus, as shown in the plot 1210, via clustering and stress inversion, solutions may be computed while applying confidence criterion. In the plot 1210, two main solutions are recovered as well as one artifact solution. Through a comparison to the plot 1205, the two main solutions can be deemed to be sound as they correspond to the first two tectonic phases of the table 905 of FIG. 9.

As two solutions in the plot 1210 of FIG. 12 can be deemed to be sound, each of these may be applied, for example, in a forward simulation. Through such an approach, the resulting locally perturbed stress tensor can be compared to the fractures from the dataset. As an example, a cost function may be implemented where cost is computed, for example, by computing the affinity of the fracture plane to each mechanical type. In such an example, where the cost is lower than a threshold value (e.g., consider a value between about 0.05 and about 0.1), a fracture (e.g., which mechanical fracture type has been defined) can be associated to the imposed tectonic phase solution. For example, for the retrieved tectonic phase 1, if a fracture F has a cost of 0.99 as a joint, 0.55 as a shear fault and 0.001 as a stylolite, the considered fracture F can be classified as a stylolite and associated to the considered tectonic phase 1.

Figure 13:
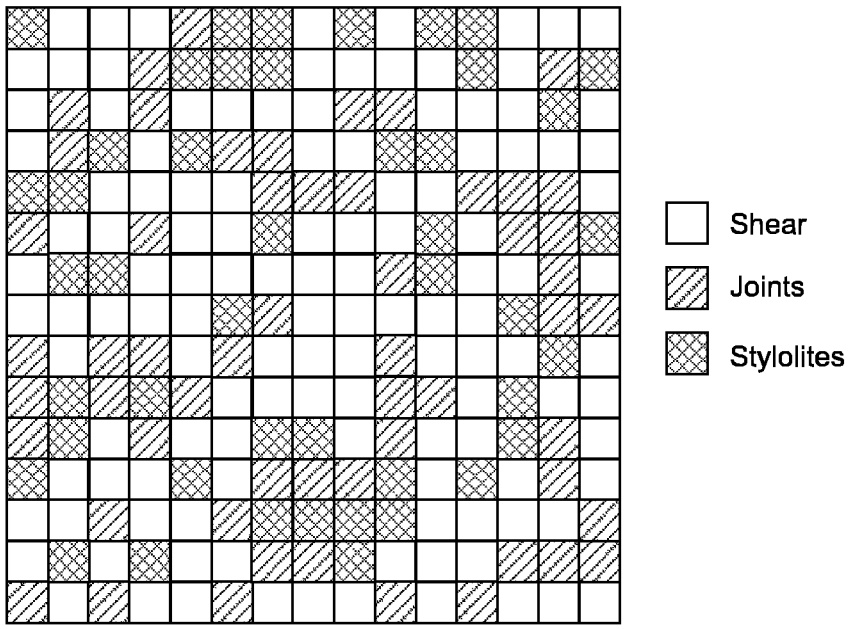
FIG. 13 illustrates examples of plots in a tectonic domain.
Figure 13:
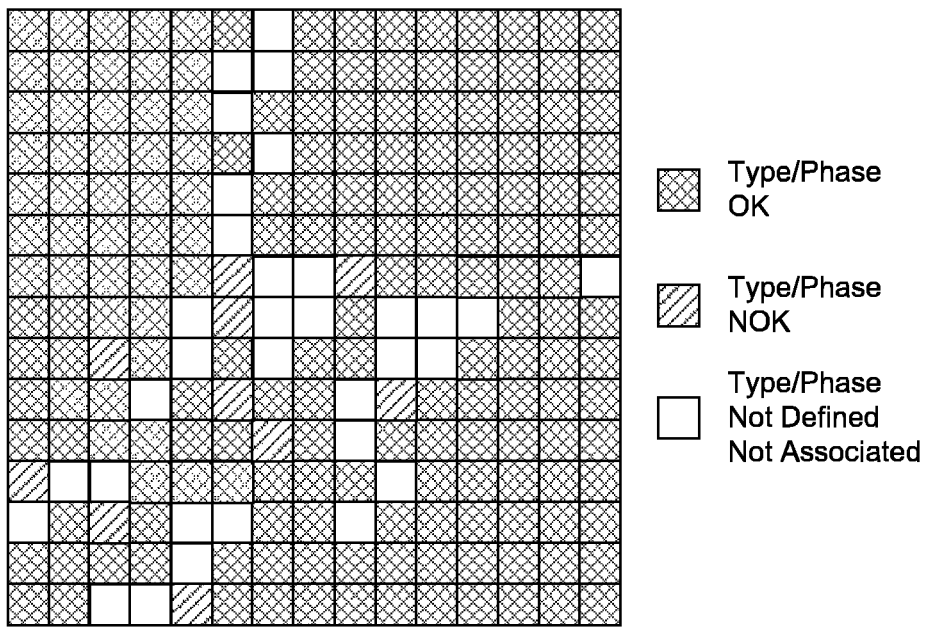

FIG. 13 shows two plots 1310 and 1330 for an example of randomly generated joints (hatching), stylolites (cross-hatching) and shear fractures (solid white) on a grid that include 225 elements or points (e.g., represented as 225 boxes, see also the plot 910 of FIG. 9). In such an example, a fracture is related to a particular tectonic phase (e.g., tectonic phase 1 or 2 of the table 905 of FIG. 9). The plot 1330 shows accuracy of the clustering, stress inversion and type inversion processes such that cross-hatching is for the successfully retrieved mechanical type associated to the appropriate tectonic phase, hatching is for fractures type that have not been appropriately retrieved and that have been associated to the wrong tectonic phase, while missing points (solid white) are for the fractures of which their type has not been defined and that could not be, within particular limits, associated to a particular tectonic phase.

Figure 14:
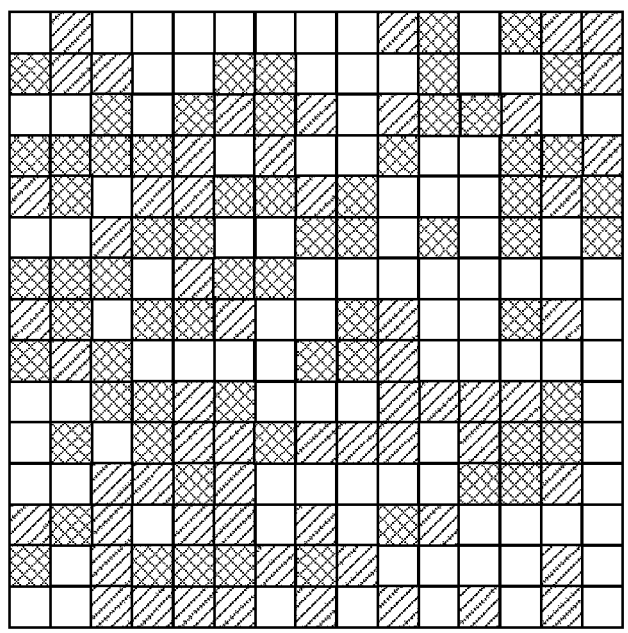
FIG. 14 illustrates examples of plots in a tectonic domain.
Figure 14:
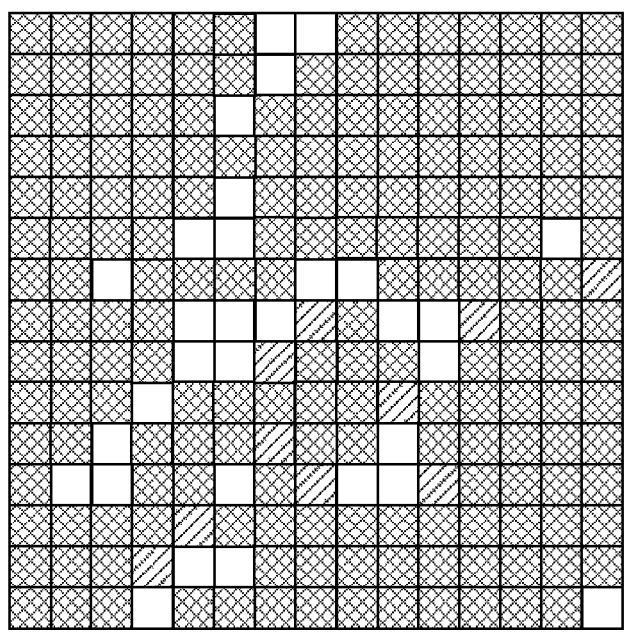

FIG. 14 shows two plots 1410 and 1430 for another, different example of randomly generated joints (hatching), stylolites (cross-hatching) and shear fractures (solid white) on a grid that include 225 elements or points (e.g., represented as 225 boxes, see also the plot 910 of FIG. 9). In such an example, a fracture is related to a particular tectonic phase (e.g., tectonic phase 1 or 2 of the table 905 of FIG. 9). The plot 1430 shows accuracy of the clustering, stress inversion and type inversion processes such that cross-hatching is for the successfully retrieved mechanical type associated to the appropriate tectonic phase, hatching is for fractures type that have not been appropriately retrieved and that have been associated to the wrong tectonic phase, while missing points (solid white) are for the fractures which type has not been defined and that could not be, within particular limits, associated to a particular tectonic phase.

For the example of FIG. 13, an analysis of the results demonstrates that 183 of 225 fractures types have been successfully identified (cross-hatching) which represents a success rate of about 81 percent; 9 of 225, about 4 percent, fracture types have been associated to the wrong type and thus to the wrong tectonic phase (hatching); and about 15 percent of the residual fractures have not been identified (solid white).

For the example of FIG. 14, an analysis of the results demonstrates that 180 of 225 fractures types have been successfully identified (cross-hatching) which represents a success rate of about 80 percent; 8 of 225, about 3.5 percent, fracture types have been associated to the wrong type and thus to the wrong tectonic phase (hatching); and about 16.5 percent residual fractures have not been identified (solid white).

As an example, a synthetic validation process may be applied. As an example, fracture type separation may depend on the number of tectonic phases and "distance" between the stress tensors (e.g., in a stress domain, etc.). As an example, an approach for a synthetic model resulted in about 80 percent of fractures being accounted for with respect to tectonic phases while a lesser accuracy rate was around 40 percent for relatively ambiguous tectonic phases (e.g., for the regime and closeness in terms of $\overline{R}$ and $\theta$), which may still provide useful information.

As an example, a method may produce some artifact results that might correspond to symmetrical artifacts (e.g., 90 degrees shifted) or regime uncertainty (e.g., normal/strike-slip for joints or reverse/strike-slip for stylolites). In such an example, a user may select or adjust one or more criteria to differentiate actual tectonic phases from artifact results.

As an example, where tectonic phases are close (e.g., in a domain space), the separation of phase might yield a particular result. As an example, where the approximation of fracture type for data clustering is lacking in certainty, realism, etc., separating fracture type accuracy may be reduced, for example, proportionally to the number of tectonic phases. As an example, where some fracture types are known, such information may be used to constrain data clustering.

As an example, stress and fracture modeling can include using a principle of superposition. As an example, given diverse input data, such as faults geometry, and selectable or optional data sets or data measures, including one or more of fault throw, dip-slip or slickenline directions, stress measurements, fracture data, secondary fault plane orientations, global positioning system (GPS) data, interferometric synthetic aperture radar (InSAR) data, geodetic data from surface tilt-meters, laser ranging, etc., a system may generate or recover stress and/or stress related information. As an example, input data may optionally be derived from one or more of well bore data, seismic interpretation, field observation, etc.

As an example, where multiple tectonic events exist, a method can include recovering one or more of the events (e.g., as a tectonic phase, etc.). As an example, a tectonic regime and/or the orientation and/or magnitude may noticeably differ for events.

As an example, a method can include performing a stress inversion to recover tectonic stress and, for example, attaching a cost to individual observation points to show confidence of the recovered tectonic stress relative to the data attached to that observation point. As an example, a cost of zero can indicate an acceptable level of confidence while a cost of one can indicate an unacceptable level of confidence. As an example, by selecting data points that are under a given threshold value and performing another stress inversion with these points, it can be possible to extract a more precise tectonic stress value. As an example, remaining data points above the threshold value may be used for performing another stress inversion, for example, in an effort to recover another tectonic event.

As mentioned, a method may include an element-based approach such as, for example, a boundary element method (BEM) based approach. As an example, a BEM approach can provide for calculation of displacements, strains, and stresses induced in an elastic whole- or half-space. In such an example, boundary elements may be triangular (e.g., by planar triangular-shaped elements of displacement discontinuity). As an example, such elements may be constructed by superposition of angular dislocations.

As an example, elastic elds around elements may be derived from a solution for a single angular dislocation in an elastic half-space or whole-space. Geologically, a triangular element may represent some portion of a fracture or fault surface across which a discontinuity in displacement is approximately constant. As an example, several triangular dislocation elements may be used to model faults or fractures; noting that some may be joined to form a closed surface that may represent a nite elastic body or a void in an otherwise in nite or semi-in nite elastic body. Such superposition may provide for modeling geological structures with various 3D boundaries and shapes, which may not be amenable to modeling with rectangular elements as curved surfaces may result in gaps and/or overlaps.

Figure 15:
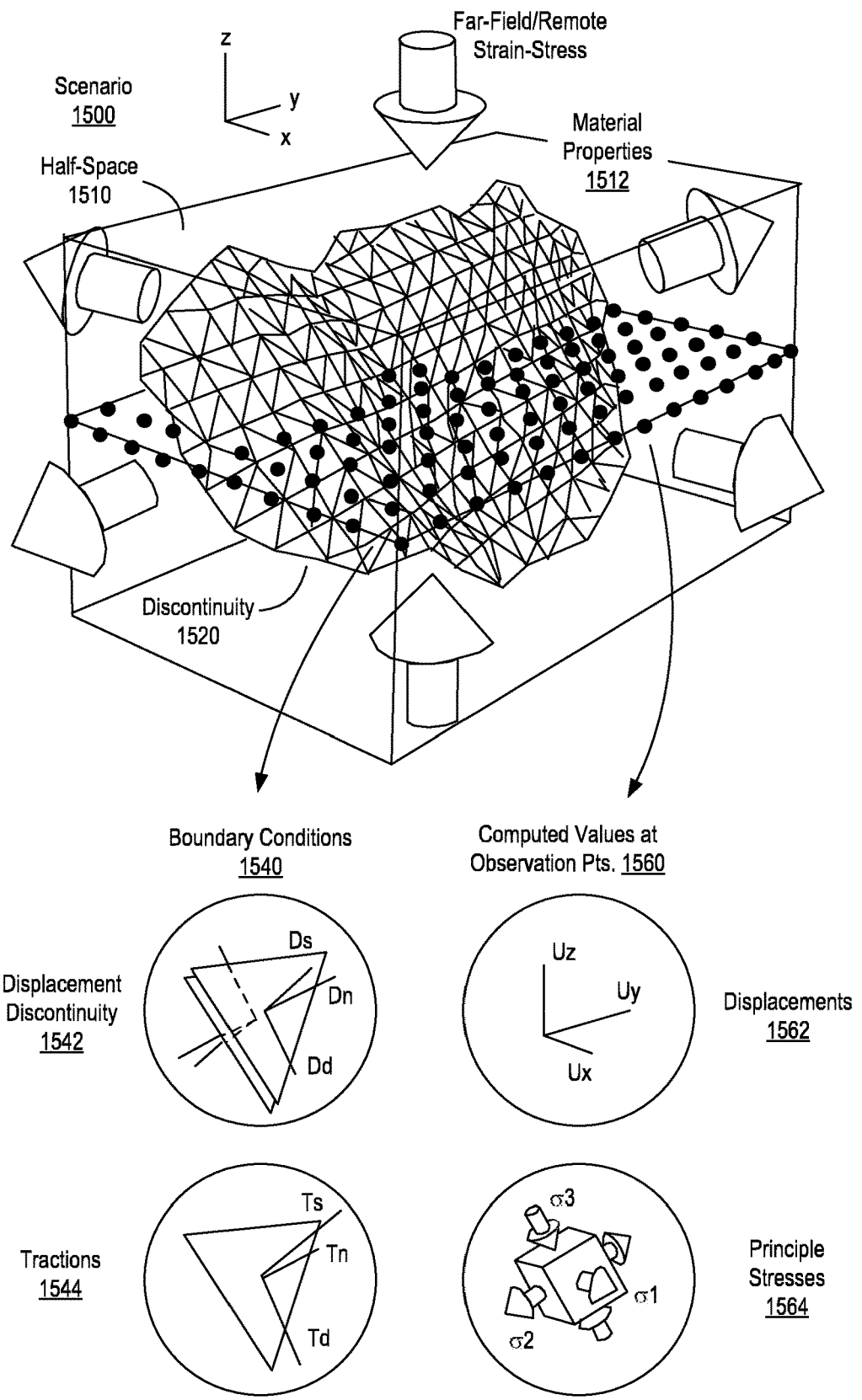
FIG. 15 illustrates an example of a boundary element model.

FIG. 15 shows an example scenario 1500 of construction of a fault geometry using triangular elements and a schematic representation of a surrounding observation grid. In particular, a half-space 1510 includes material properties 1512 and a discontinuity 1520 (e.g., a fault surface). Boundary conditions 1540 on triangular elements may be a combination of displacement discontinuity conditions 1542 and traction conditions 1544, for example, de ned in an element coordinate system. As an example, an element coordinate system may be such that the x- and y-axes are along the dip- and strike-directions, respectively. In such an example, the z-axis may be aligned with the normal of an element. At individual observation points, displacements 1562 and stresses and strains 1564 may be computed (e.g., optionally as a post-process). FIG. 15 also shows 3D remote strain or stress (e.g. far-field effects).

As illustrated in FIG. 15, boundary conditions may be de ned as to a doubly triangulated surface (e.g., one for each region or side of a discontinuity) that are coincident with oppositely directed normal vectors. As an example, a region may be characterized by a homogeneous and isotropic material and elastic moduli may differ from region to region. An interface between two different regions can transmit the mechanical in uence of one region on the other, for example, by computing the corresponding Burgers vectors for two adjacent elements on the interface using continuity and equilibrium conditions prescribed in a global coordinate system (e.g., different regions can be linked through the continuity and equilibrium conditions at an interface).

As an example, a method may include retrieving slip distribution on one or more 3D faults, for example, given measurements of ground displacements (e.g., from global positioning system (GPS), synthetic aperture radar interferometry (InSAR), etc.), optionally associated with one or more tectonic events such as earthquakes, etc. As an example, an indirect boundary element method may be implemented for an inversion. As an example, a weighted least-squares approach combined with a Tikhonov regularization may be implemented. As an example, a system of equations may be solved with a constrained solver to generate a solution.

As an example, constraints may allow slip components to invert to be either negative or positive. As an example, a forward formulation may be extended to linear slip inversion. In such an example, triangular elements may be implemented, for example, to reduce risk of gaps and overlaps between adjacent elements, which can lead to numerical artifacts (e.g., as may exist with rectangular elements). As an example, a method may implement triangular elements to model information close to a fault.

As an example, a method may, given data that constrain fault geometry, as well as boundary conditions on elements making up a fault, include determining remote stress or strain to apply to a model. For example, using an iteratively coupled double system, tectonic stress may be estimated given measures of the displacement discontinuity on at least some parts of faults. As an example, throw and/or dip-slip measurements may be available from rejection seismic interpretation.

As an example, a method may include inverting for tectonic stress. In such an example, the method may recover (e.g., simultaneously) the unknown displacement discontinuities on faults. Such an approach can allows for extending the fault geometry, if desired, and to compute the unknown dip- and strike-slip.

As an example, a method can include performing tectonic stress analysis via the principle of superposition that can apply to linear elasticity for heterogeneous, isotropic whole- of half-space media. As an example, given some measures of fault throw, dip-slip, slickenline directions, stress measurements as well as fault geometry, GPS data, InSAR data, fractures (joints, veins, dikes, pressure solution seams with stylolites), micro-seismicity, breakout orientations or secondary fault plane orientations, a method may include recovering remote stress state for multiple tectonic events (e.g., efficiently using a mechanical scenario). As an example, in an implementation of the principle of superposition, an individual simulation may be performed in constant time. As an example, a method may include performing one or more and Monte-Carlo simulations.

As an example, a method can include implementing an H-matrix technique during computation of a preconditioner. An H-matrix approach can include forming a matrix into several blocks such that near-eld block in uences are retained whereas far-eld blocks can be approximated by interpolation or rank reduction. As an example, a geometrical rule may be selected for clustering. As an example, a recursive bisection rule may be applied. In such an example, using a kd-tree, a subdivision by bisection may be applied recursively, leading to a binary tree of blocks with a root. As an example, recursive subdivision may terminate when the number of items in a block reaches a prescribed minimum. A result can be a binary partition of the model made of blocks. Given such a result, a method may include determining near- and far-eld blocks using this decomposition.

As an example, an H-matrix technique may commence at a root of a tree and generate an H-matrix as a structure. In such an example, at least a portion of the blocks may be deemed to be near and at least a portion of the blocks may be deemed to be far. As an example, considering that far parts of a model yield some approximated blocks, a method can include assuming that the contribution of such blocks can be neglected during the computation of a preconditioner.

As an example, a linear solver may utilize a direct method or an iterative method to determine a solution. As to a direct method, consider Gaussian elimination where a matrix is factorized into a product of a lower triangular matrix, L, and upper triangular matrix, U (e.g., A=LU). For large sparse matrices, computation of triangular matrices L and U can become expensive as the number of non-zero entries in each factor becomes large.

As an example, for an iterative method, a linear system of equations may be solved using approximations to a matrix. For example, an incomplete lower-upper ILU factorization may be used, instead of a full factorization as in the direct method. In such an example, a product of sparse factors L and U may be computed such that their product approximates the matrix (A≈LU). When employing an iterative method, a solution is updated in an iterative manner until convergence is reached (e.g., some proscribed error limit or limits have been met). Iterative methods may converge slowly for large systems of linear equations because the number of iterations can increase as a number of unknowns increases.

As an example, a method can include receiving a boundary element model that includes boundary elements that may be numbered from 0 to N and formulating a system of equations for the elements where an N×N array (e.g., an N×N matrix) may be dense in that it includes interaction terms where an individual boundary element interacts with other individual boundary elements. Such a method can include iteratively solving a system of equations to output a solution and, for example, performing one or more operations in the geologic environment based at least in part on the solution. For example, an operation may include a drilling operation, a fracturing operation, an extraction operation, an injection operation, etc.

As an example, a method, or a portion thereof, may be part of a workflow. For example, where a geologic environment includes a reservoir, the a method may be performed as part of a workflow to develop the reservoir (e.g., via field operations, etc.). As an example, development of a reservoir can include extracting one or more resources (e.g., hydrocarbons, etc.) from the reservoir.

As an example, a method may include solving a system of equations formulated according to the BEM to output a solution and performing an operation based at least in part on the solution.

As an example, a method can include receiving a system of equations with associated variables that describe physical phenomena associated with a geologic formation; representing a matrix for the system of equations; and solving the system of equations.

As an example, a method can include receiving a system of equations with associated variables that describe physical phenomena associated with a geologic formation where the system of equations include coordinates associated with elements of a boundary element model. As an example, elements may include boundary elements that represent a surface. For example, consider a surface that corresponds to a discontinuity that defines at least two regions.

As an example, a method can include receiving a system of equations with associated variables that describe physical phenomena associated with a geologic formation where the system of equations includes coordinates associated with elements of a finite element model.

As an example, a method can include receiving data for fractures associated with a geologic environment; performing stress inversion, based at least in part on a portion of the data and assignment of different mechanical fracture types to different populations of the fractures, to recover tectonic stress; and outputting the tectonic stress. In such an example, the data for fractures can include data for one or more natural fractures and/or data for one or more artificial fractures. As an example, one or more artificial fractures can include at least one hydraulic fracture in a geologic environment. As an example, one or more artificial fractures can include at least one proposed hydraulic fracture to be created in a geologic environment.

As an example, a method can include calculating a confidence metric that is based at least in part on different mechanical fracture types and, for example, associating tectonic stress with the confidence metric. As to different mechanical fracture types, consider, for example, a group that includes one or more of joints, stylolites and shear fractures.

As an example, a method can include rendering a plot to a display where the plot includes a representation of the tectonic stress. In such an example, the representation of the tectonic stress may depend at least in part on a confidence metric. For example, consider a plot in a domain space where a characteristic of a marker (e.g., size, color, etc.) depends at least in part on a confidence metric.

As an example, a method can include performing a forward simulation based at least in part on tectonic stress to output a locally perturbed stress tensor. For example, tectonic stress as associated with a geologic environment may be a result of an inversion technique and a forward simulation may output a locally perturbed stress tensor for at least a portion of the geologic environment. As an example, a method can include, based at least in part on a locally perturbed stress tensor for a geologic environment, assigning at least a portion of fractures in the geologic environment to a mechanical fracture type. In such an example, assigning can include computing a cost function based at least in part on fracture plane orientation associated with the locally perturbed stress tensor and the mechanical fracture type.

As an example, a method can include performing stress inversion, based at least in part on a portion of data and assignment of different mechanical fracture types to different populations of fractures, to recover tectonic stress where such tectonic stress corresponds to a tectonic phase. In such an example, the method can include repeating performing stress to recover tectonic stress that corresponds to a different tectonic phase. As an example, a method can include outputting tectonic stresses for multiple tectonic phases.

As an example, a system can include a processor; memory; and one or more modules stored in the memory where the one or more modules can include processor-executable instructions to instruct the system where instructions include instructions to receive data for fractures associated with a geologic environment; perform stress inversion, based at least in part on a portion of the data and assignment of different mechanical fracture types to different populations of the fractures, to recover tectonic stress; and output the tectonic stress. In such an example, instructions can be included to compute a confidence metric that depends at least in part on one or more mechanical fracture types. As an example, a system can include instructions to separate at least a portion of fractures into populations of different mechanical fracture types.

As an example, one or more computer-readable storage media can include processor-executable instructions to instruct a computing system where instructions can include instructions to receive data for fractures associated with a geologic environment; perform stress inversion, based at least in part on a portion of the data and assignment of different mechanical fracture types to different populations of the fractures, to recover tectonic stress; and output the tectonic stress. In such an example, instructions can be included to compute a confidence metric that depends at least in part on one or more mechanical fracture types. As an example, one or more computer-readable storage media can include instructions to separate at least a portion of fractures into populations of different mechanical fracture types (e.g., joints, stylolites, shear, etc.).

Figure 16:
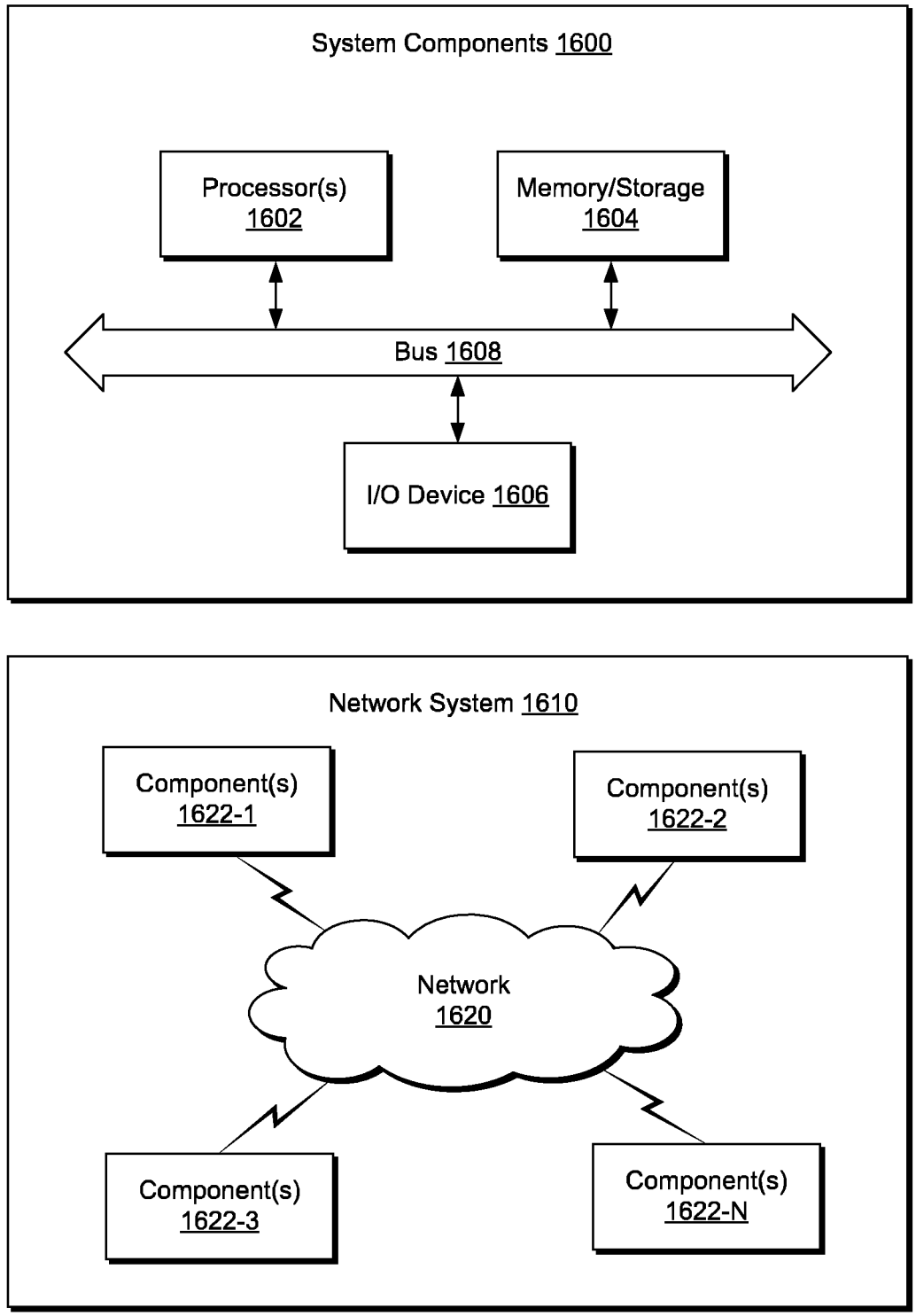
FIG. 16 illustrates example components of a system and a networked system.

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . , 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A method comprising:
   receiving data for fractures associated with a geologic environment, wherein the fractures have an unknown fracture type;
   assigning different fracture types to different populations of the fractures prior to determining a fracture type for the fractures based on a characteristic of the fractures;
   performing a stress inversion, based at least in part on a portion of the data representing one or more unknown fracture types and assignment of different mechanical fracture types to different populations of the fractures, to recover tectonic stress;
   creating a subset of the fractures based on a similarity of the fractures to the fracture type assigned thereto, according to the recovered tectonic stress;
   performing stress inversion using the fractures of the subset to recover a refined tectonic stress; and
   outputting the refined tectonic stress.

2. The method of claim 1 wherein the data for fractures comprises data for one or more natural fractures.

3. The method of claim 1 wherein the data for fractures comprises data for one or more artificial fractures.

4. The method of claim 3 wherein the one or more artificial fractures comprise at least one hydraulic fracture in the geologic environment.

5. The method of claim 3 wherein the one or more artificial fractures comprise at least one proposed hydraulic fracture to be created in the geologic environment.

6. The method of claim 1 further comprising calculating a confidence metric that is based at least in part on the different mechanical fracture types.

7. The method of claim 6 further comprising associating the tectonic stress with the confidence metric.

8. The method of claim 1 further comprising rendering a plot to a display wherein the plot comprises a representation of the tectonic stress.

9. The method of claim 8 wherein the representation of the tectonic stress depends at least in part on a confidence metric.

10. The method of claim 1 further comprising performing a forward simulation based at least in part on the tectonic stress to output a locally perturbed stress tensor.

11. The method of claim 10 further comprising, based at least in part on the locally perturbed stress tensor, assigning at least a portion of the fractures in the geologic environment to a mechanical fracture type.

12. The method of claim 11 wherein the assigning comprises computing a cost function based at least in part on fracture plane orientation associated with the locally perturbed stress tensor and the mechanical fracture type.

13. The method of claim 1 wherein the tectonic stress corresponds to a tectonic phase and the method further comprises repeating the performing of the stress inversion to recover tectonic stress that corresponds to a different tectonic phase.

14. The method of claim 1 further comprising outputting tectonic stresses for multiple tectonic phases.

15. The method of claim 1 wherein the assignment of different mechanical fracture types to different populations of the fractures is based on a random assignment technique.

16. The method of claim 1 wherein:
performing the stress inversion comprises performing a first stress inversion using a selected fracture of the fractures as a constraint, to recover a first tectonic stress;
the method further comprises applying the first tectonic stress to determine one or more predicted fracture characteristics for the fractures; and
creating the subset comprises:
determining a cost for the fractures based at least in part on the predicted fracture characteristics; and
creating the subset of the fractures based at least in part on the cost.

17. The method of claim 16 wherein performing the stress inversion further comprises:
removing the fractures of the subset from the data; and
performing a second stress inversion of the data using a different selected fracture of the plurality of fractures as a constraint, to recover a second tectonic stress.

18. The method of claim 1 further comprising:
creating a plurality of subsets of fractures using different tectonic stresses;
plotting the plurality of subsets in a stress domain comprising an axis representing stress ratio and an axis representing stress orientation; and
determining clusters representing one or more tectonic phases based in part on a proximity of the subsets in the stress domain.

19. The method of claim 18 wherein plotting the plurality of subsets in the stress domain comprises visualizing a confidence level of the clusters, wherein the confidence level is based on a data type diversity and number of fractures in the clusters.

20. The method of claim 18 further comprising determining a fracture type for the fractures in the subsets of one of the clusters based on a similarity of the fractures in the subsets of the one the clusters based to the fracture type.

21. The method of claim 1 wherein assigning comprises randomly assigning or assigning based at least in part on one or more statistical measures.

22. A system comprising:
a processor;
memory; and
one or more modules stored in the memory wherein the one or more modules comprise processor-executable instructions to instruct the system wherein the instructions comprise instructions to:
receive data for fractures associated with a geologic environment, wherein the fractures have an unknown fracture type;
assign different fracture types to different populations of the fractures prior to determining a fracture type for the fractures based on a characteristic of the fractures;
perform a stress inversion, based at least in part on a portion of the data representing one or more unknown fracture types and assignment of different mechanical fracture types to different populations of the fractures, to recover tectonic stress;
create a subset of the fractures based on a similarity of the fractures to the fracture type assigned thereto, according to the recovered tectonic stress;
perform stress inversion using the fractures of the subset to recover a refined tectonic stress; and
output the refined tectonic stress.

23. The system of claim 22 further comprising instructions to compute a confidence metric that depends at least in part on one or more mechanical fracture types.

24. The system of claim 22 further comprising instructions to separate at least a portion of the fractures into populations of different mechanical fracture types.

25. One or more non-transitory computer-readable storage media comprising processor-executable instructions to instruct a computing system wherein the instructions comprise instructions to:
receive data for fractures associated with a geologic environment, wherein the fractures have an unknown fracture type;
assign different fracture types to different populations of the fractures prior to determining a fracture type for the fractures based on a characteristic of the fractures;
perform a stress inversion, based at least in part on a portion of the data representing one or more unknown fracture types and assignment of different mechanical fracture types to different populations of the fractures, to recover tectonic stress;
create a subset of the fractures based on a similarity of the fractures to the fracture type assigned thereto, according to the recovered tectonic stress;
perform stress inversion using the fractures of the subset to recover a refined tectonic stress; and
output the refined tectonic stress.

26. The one or more non-transitory computer-readable storage media of claim 25 further comprising instructions to compute a confidence metric that depends at least in part on one or more mechanical fracture types.

27. The one or more non-transitory computer-readable storage media of claim 25 further comprising instructions to separate at least a portion of the fractures into populations of different mechanical fracture types.

* * * * *